Aug. 3, 1937.  H. E. BALSIGER ET AL  2,088,682
INTERNAL GRINDER
Filed Aug. 5, 1933  29 Sheets-Sheet 7
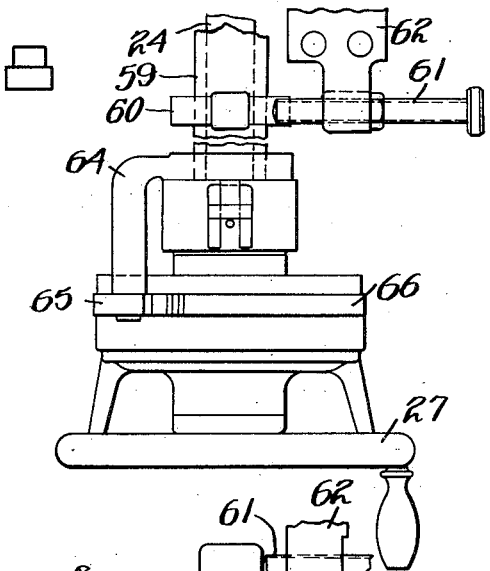
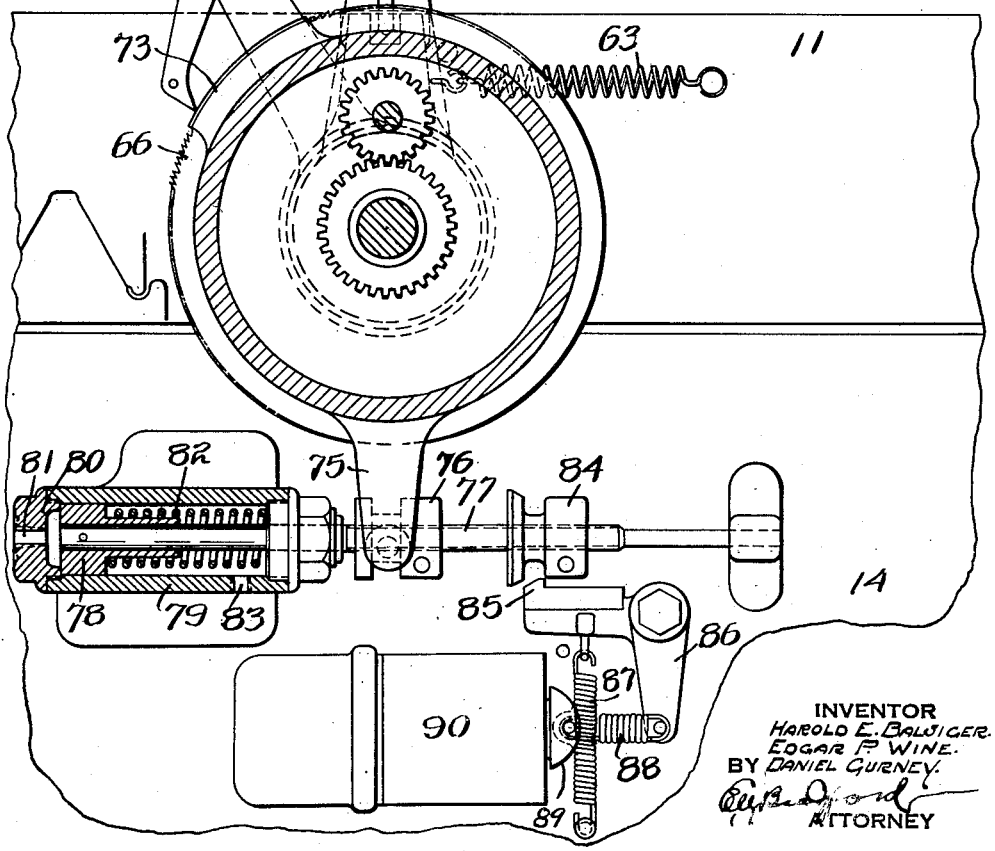
INVENTOR
HAROLD E. BALSIGER.
EDGAR P. WINE.
BY DANIEL GURNEY.
ATTORNEY

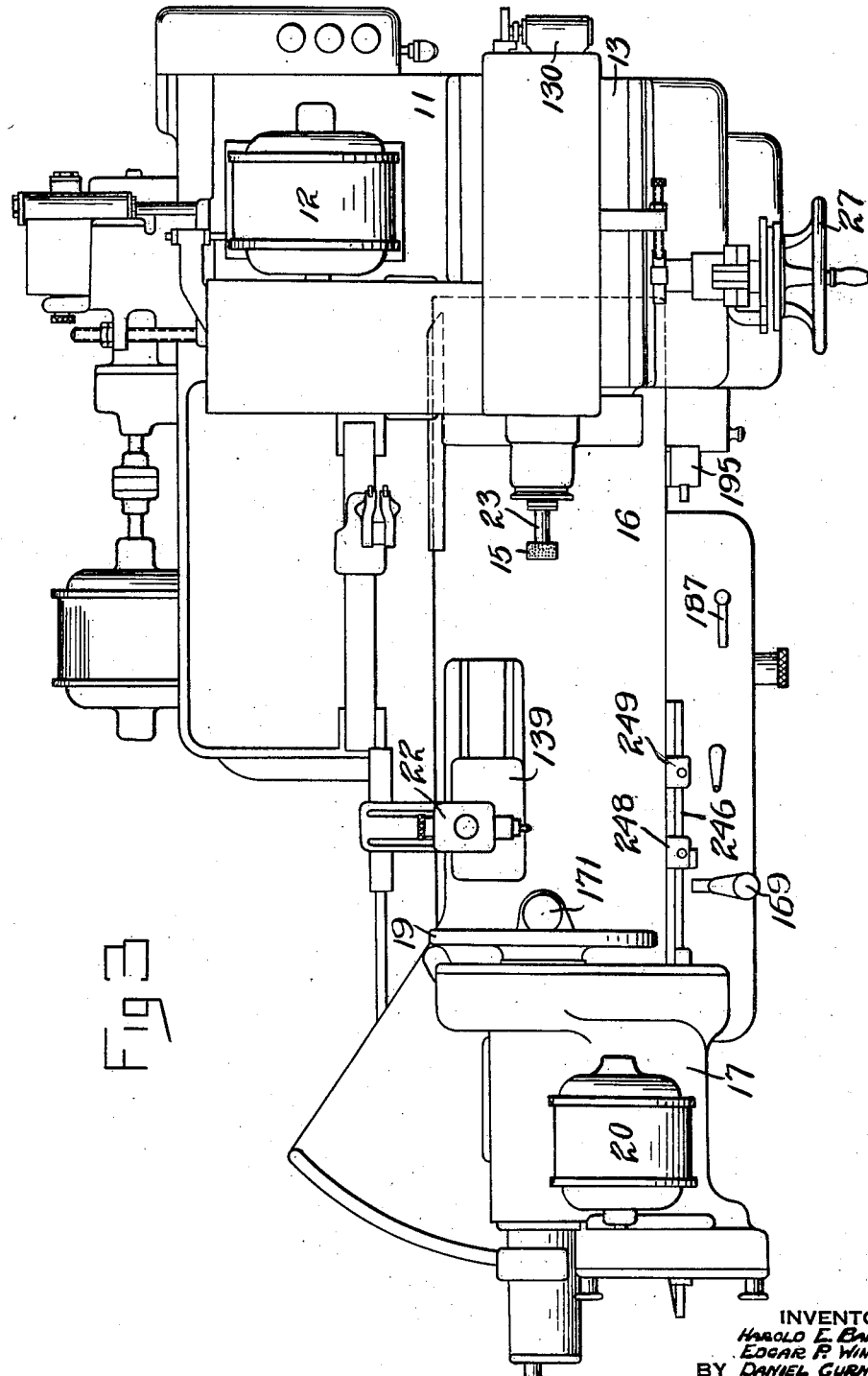

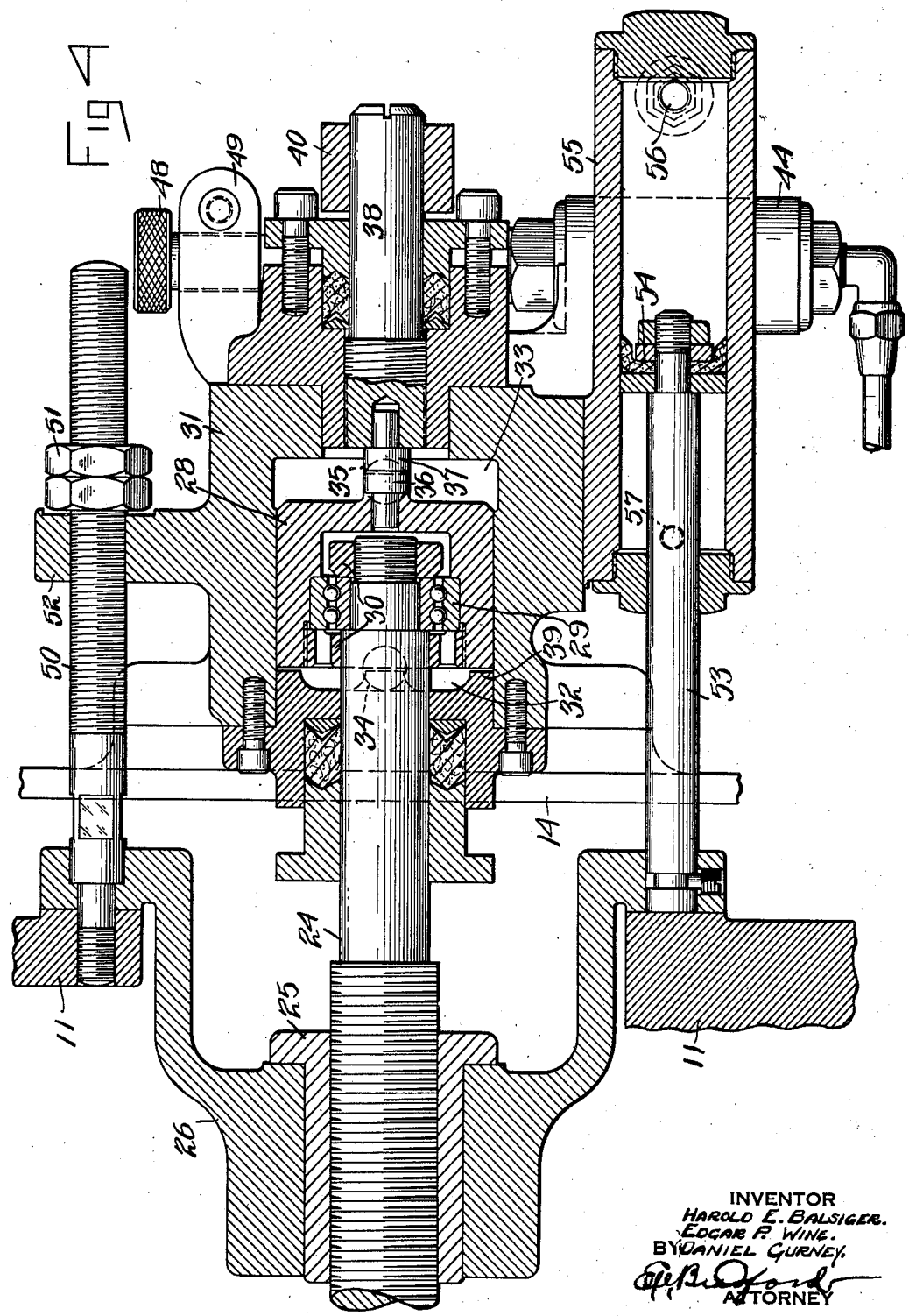

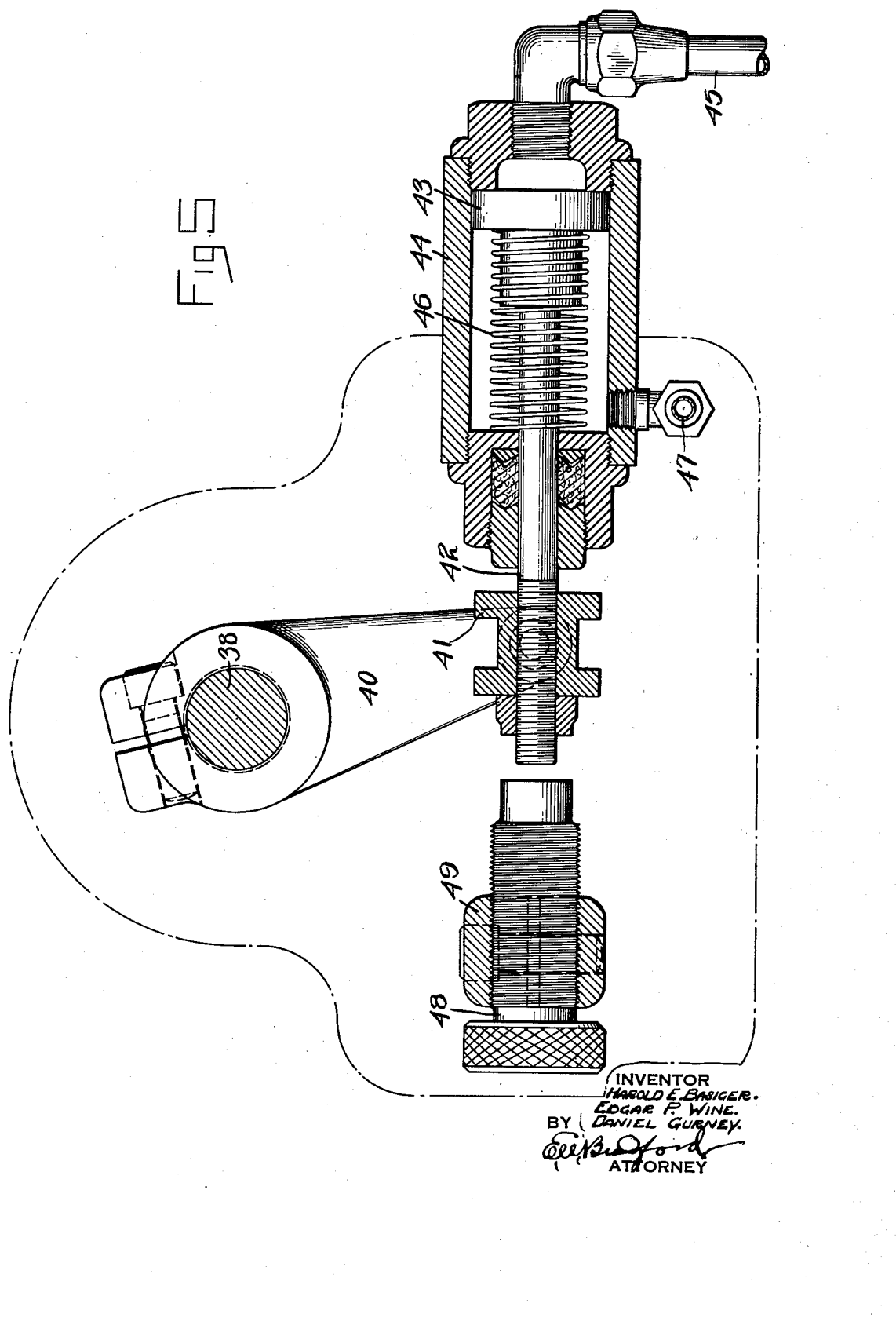

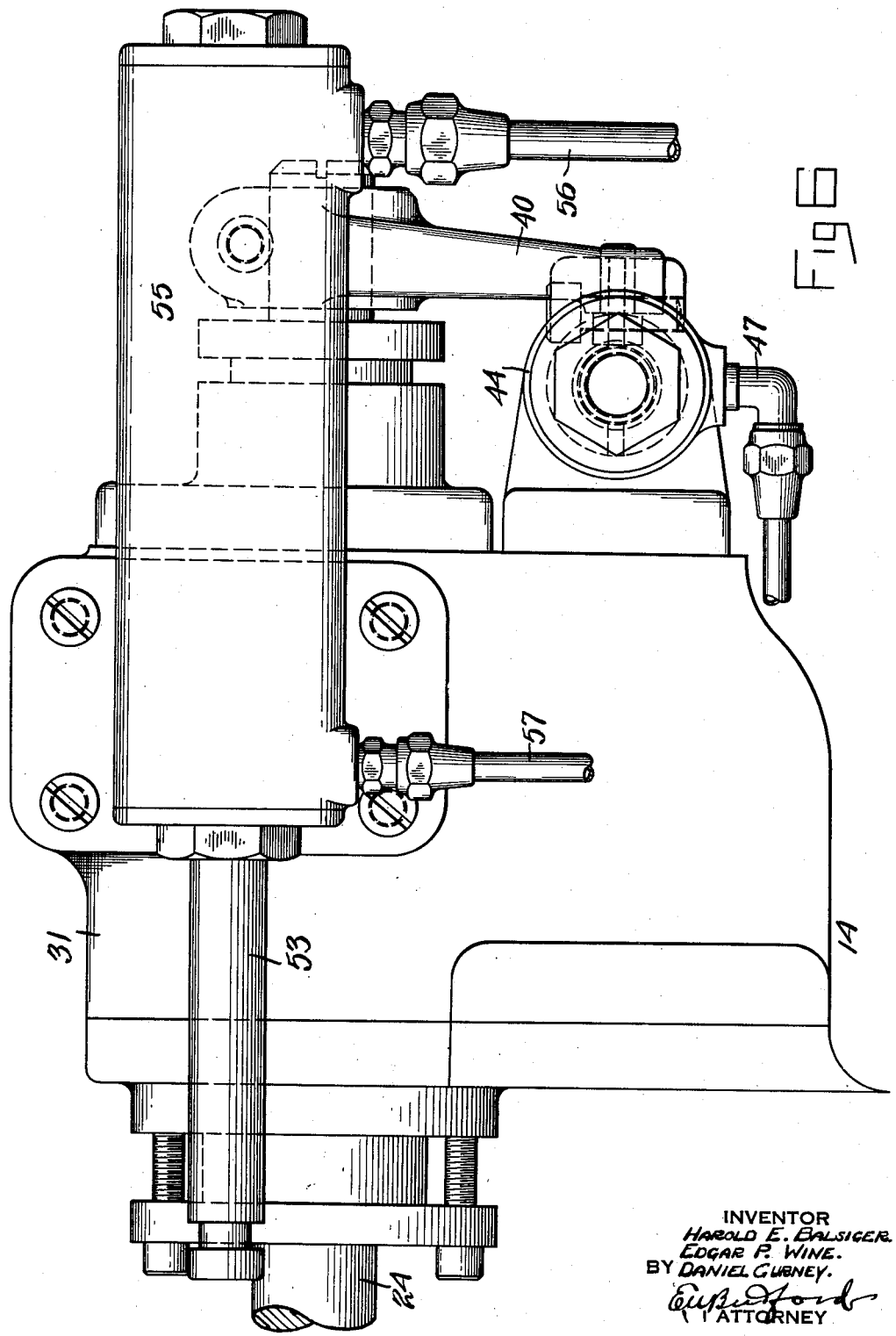

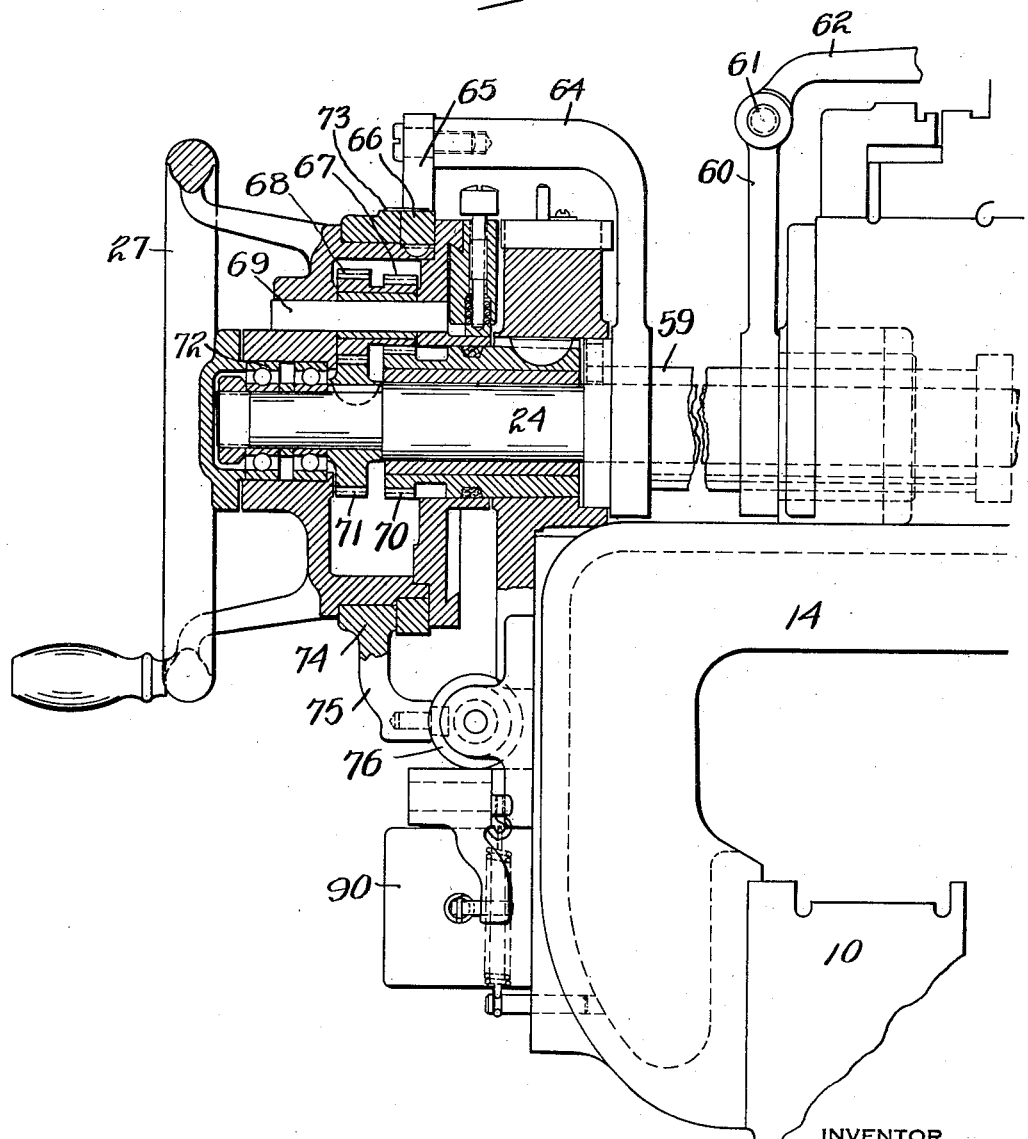

Aug. 3, 1937.  H. E. BALSIGER ET AL  2,088,682
INTERNAL GRINDER
Filed Aug. 5, 1933  29 Sheets-Sheet 9
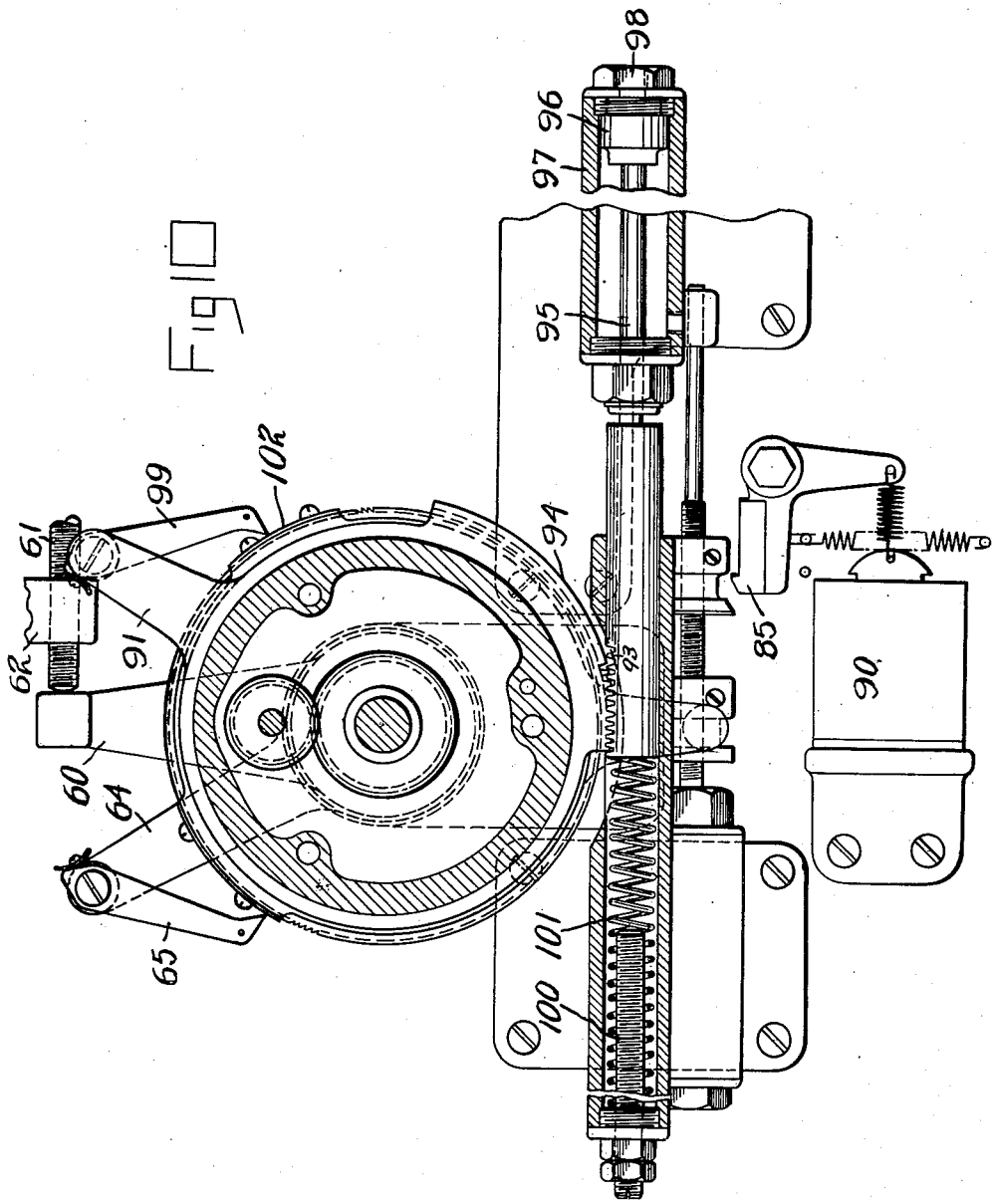
INVENTOR
HAROLD E. BALSIGER.
EDGAR P. WINE.
BY DANIEL GURNEY.
ATTORNEY

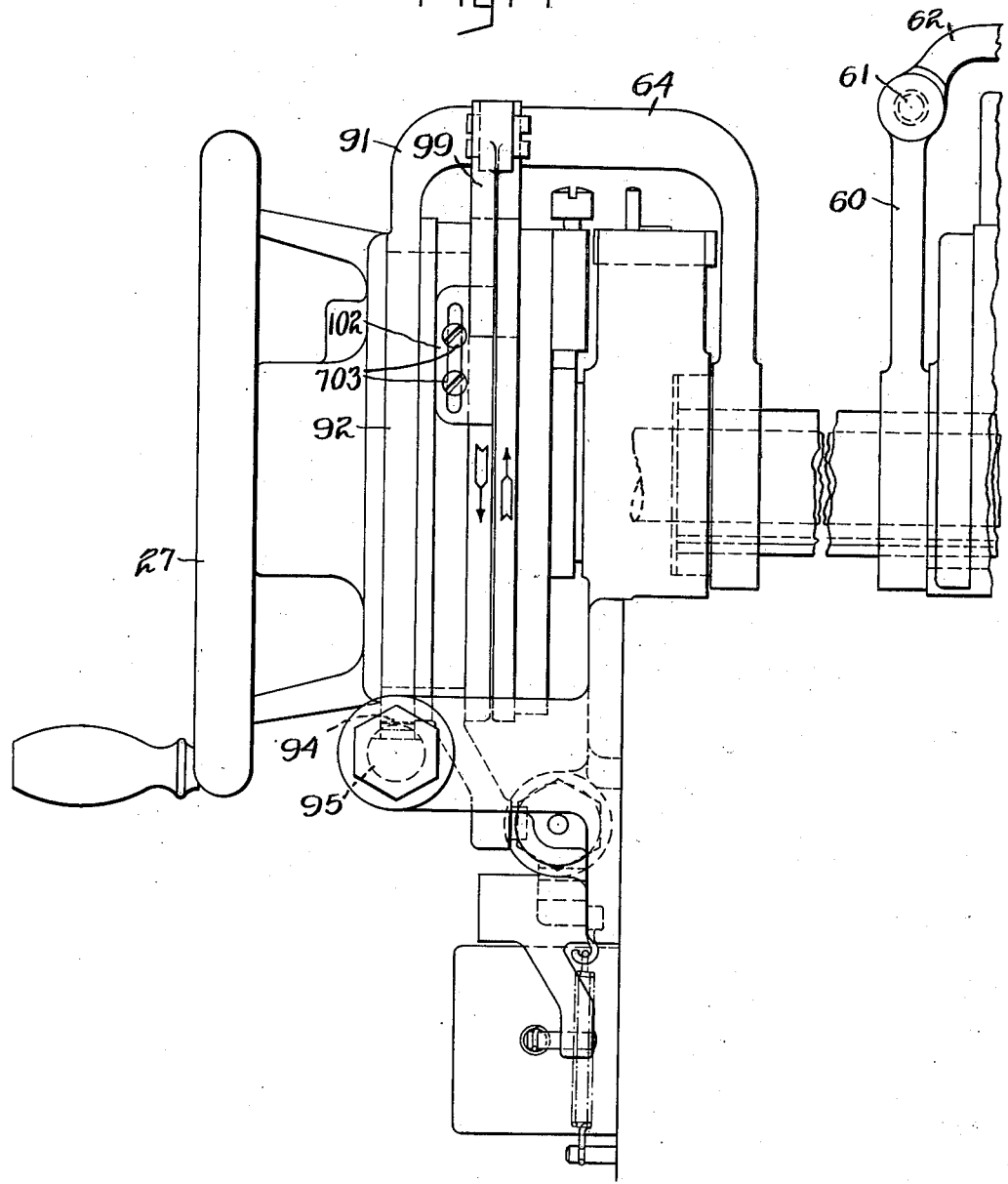

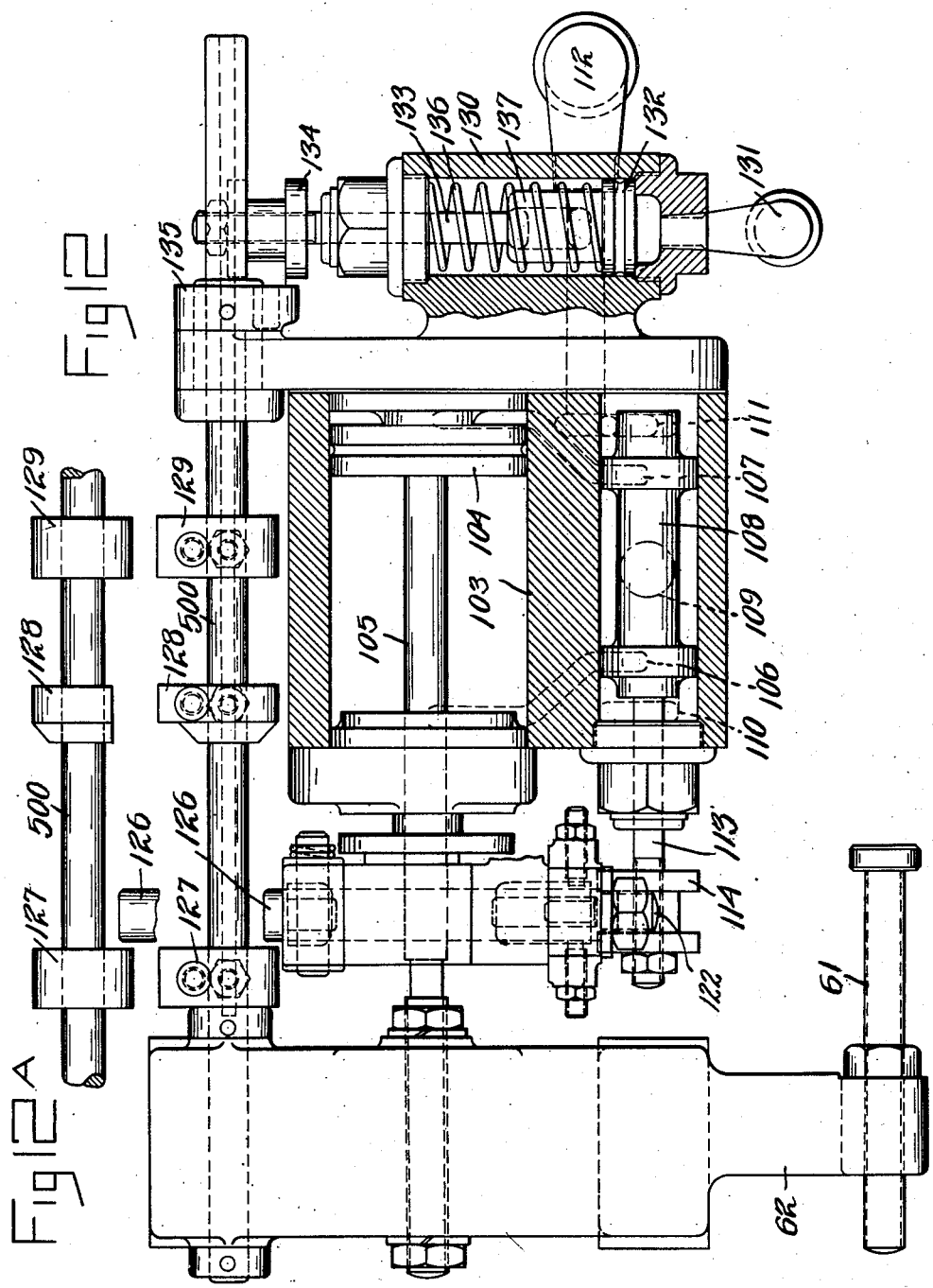

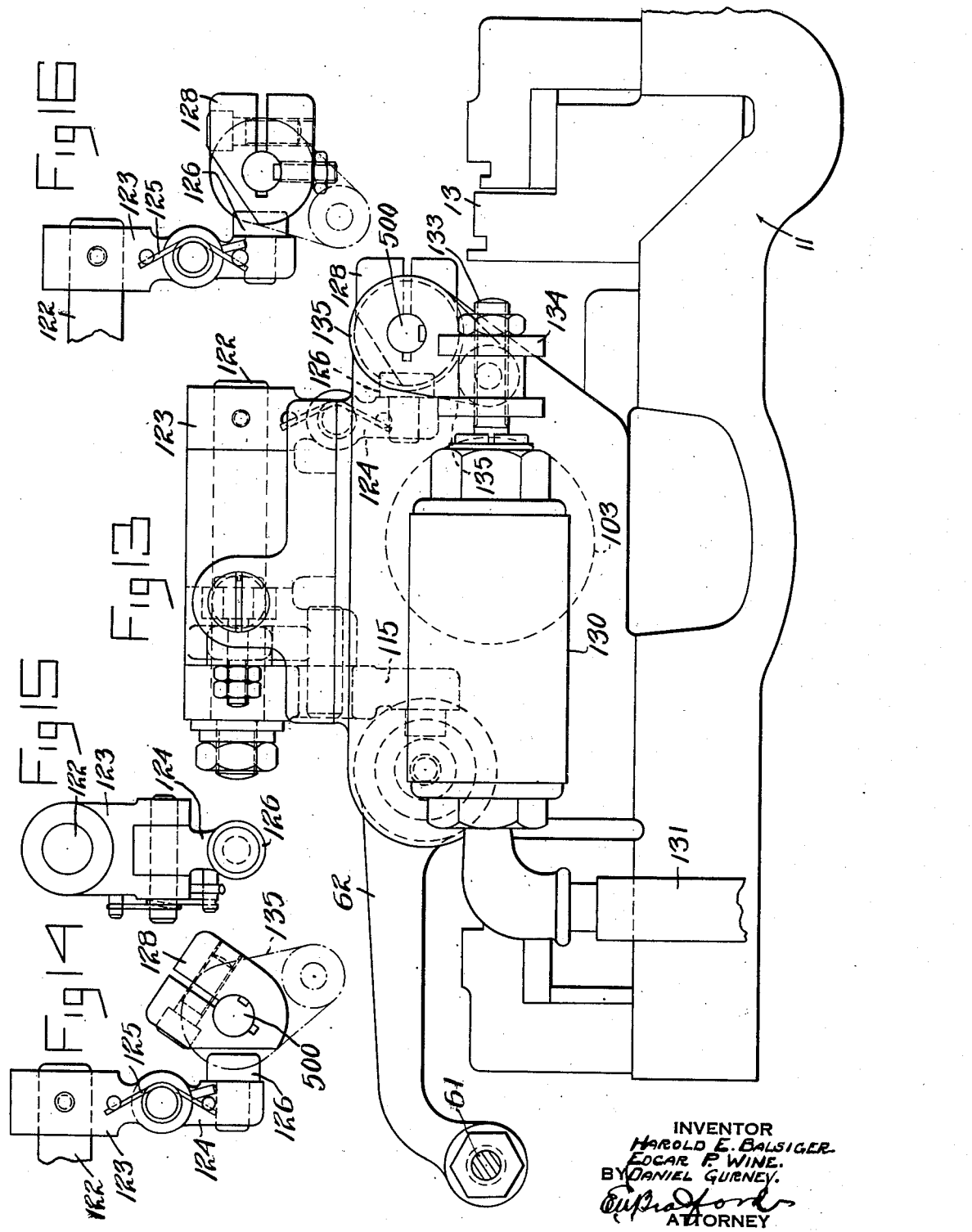

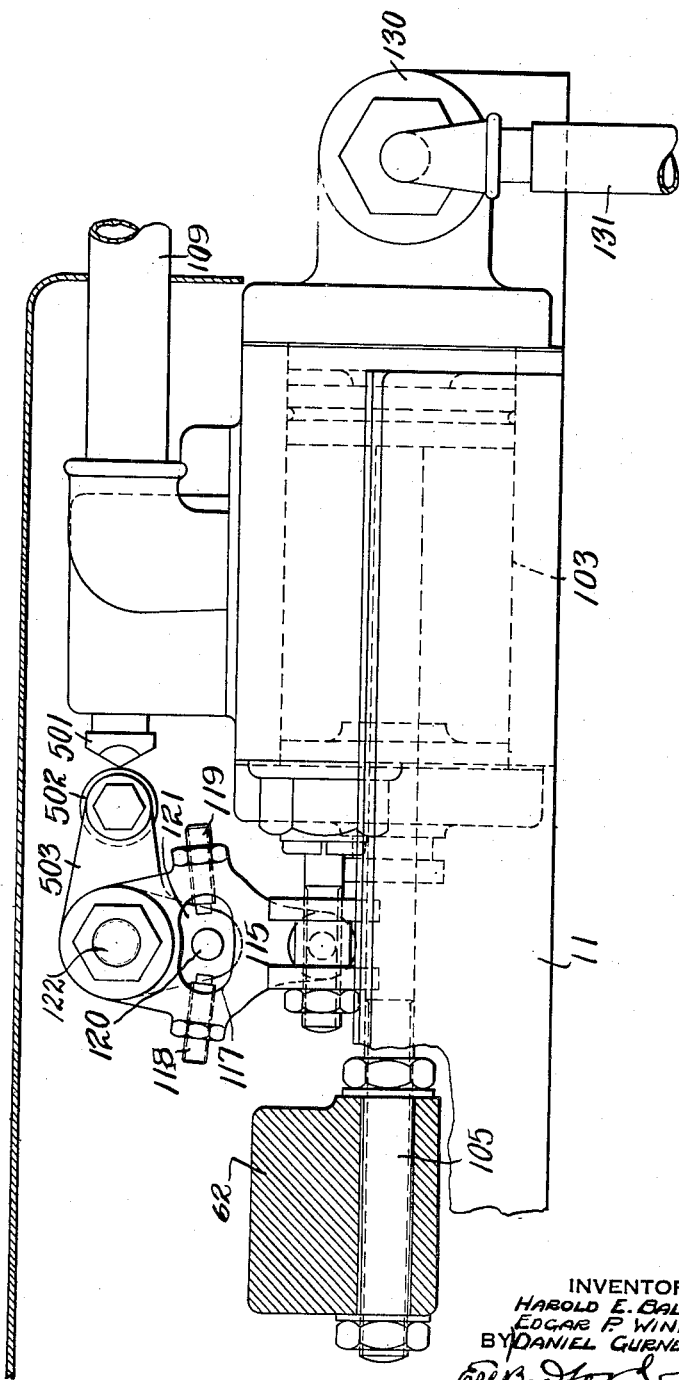

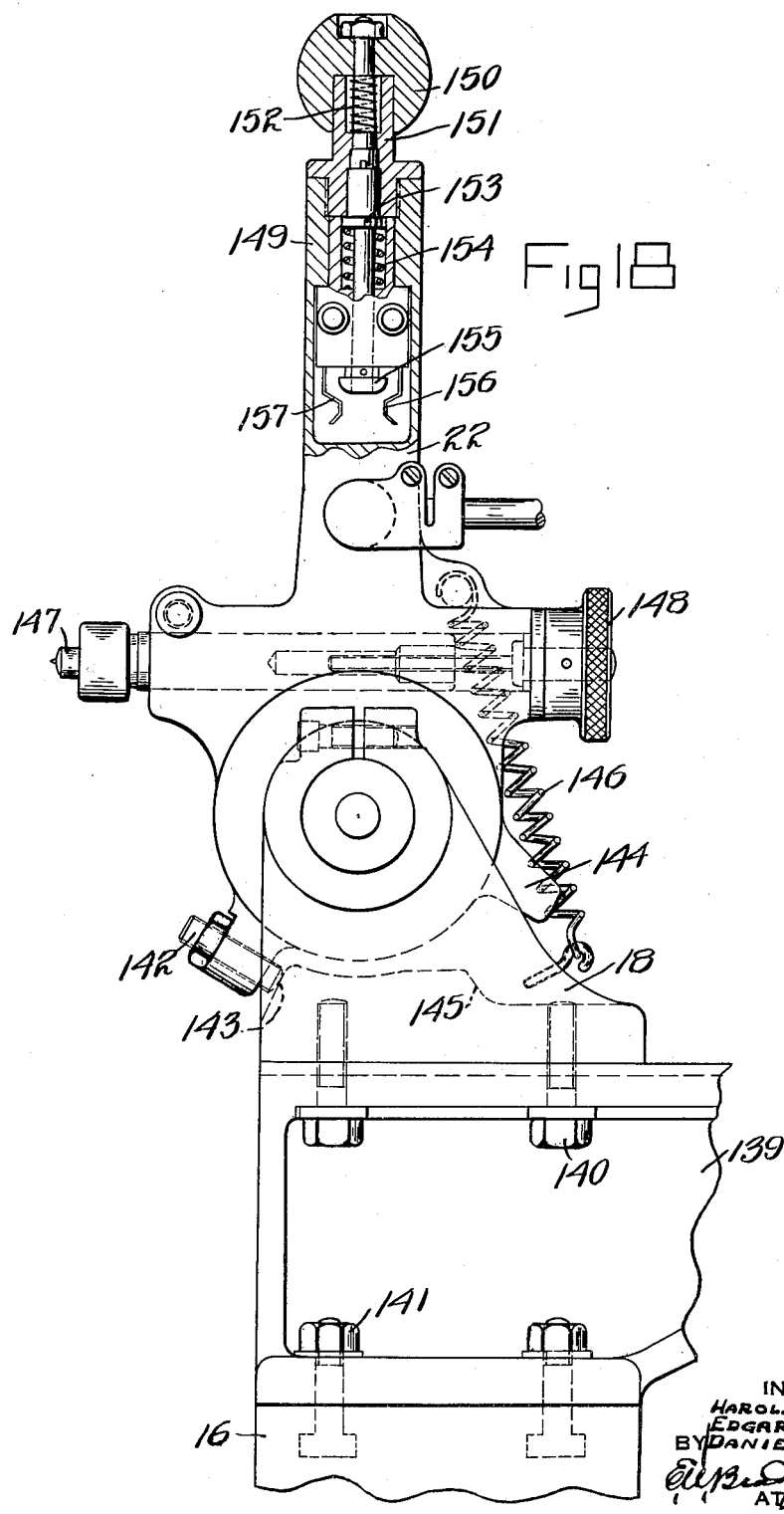

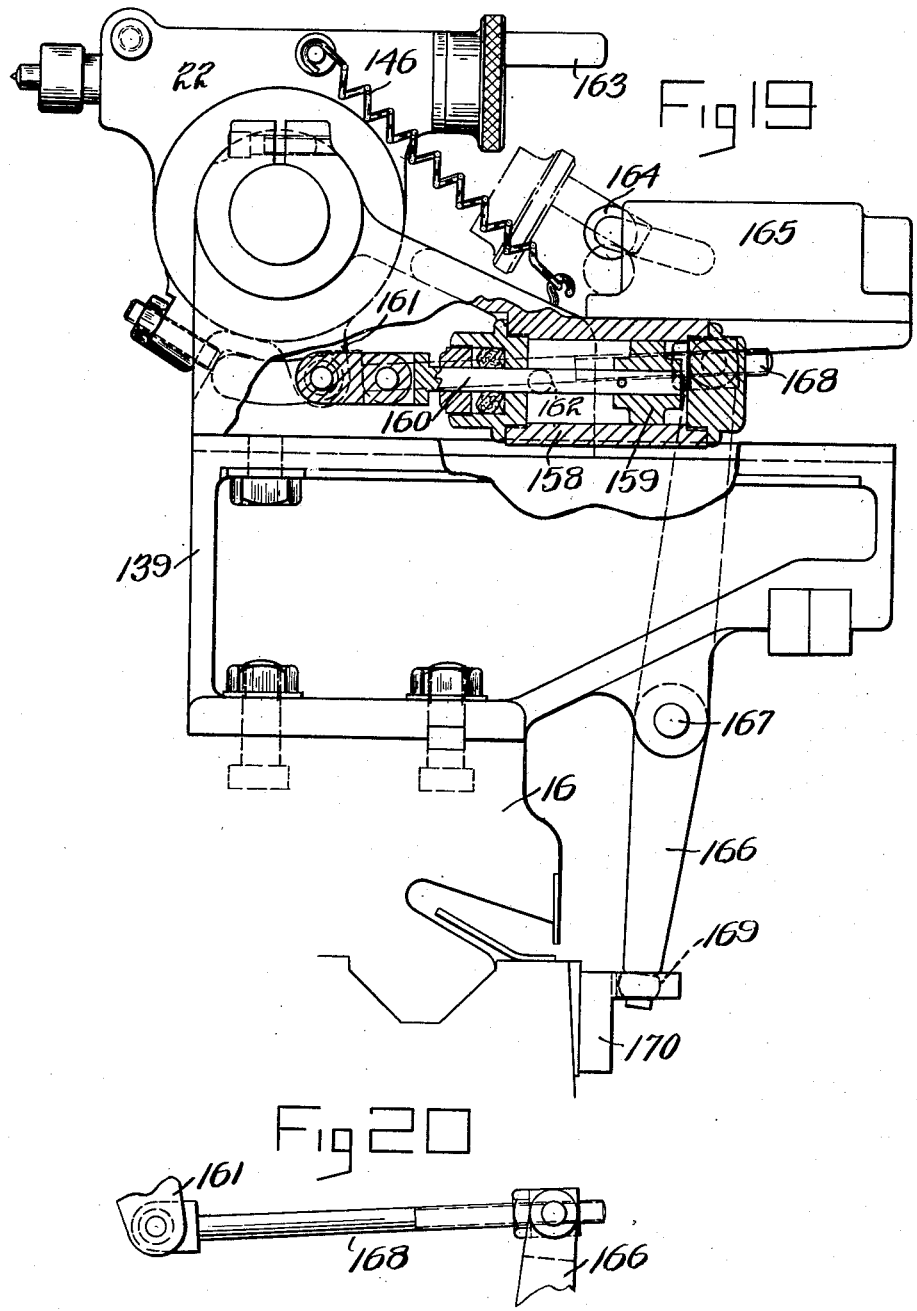

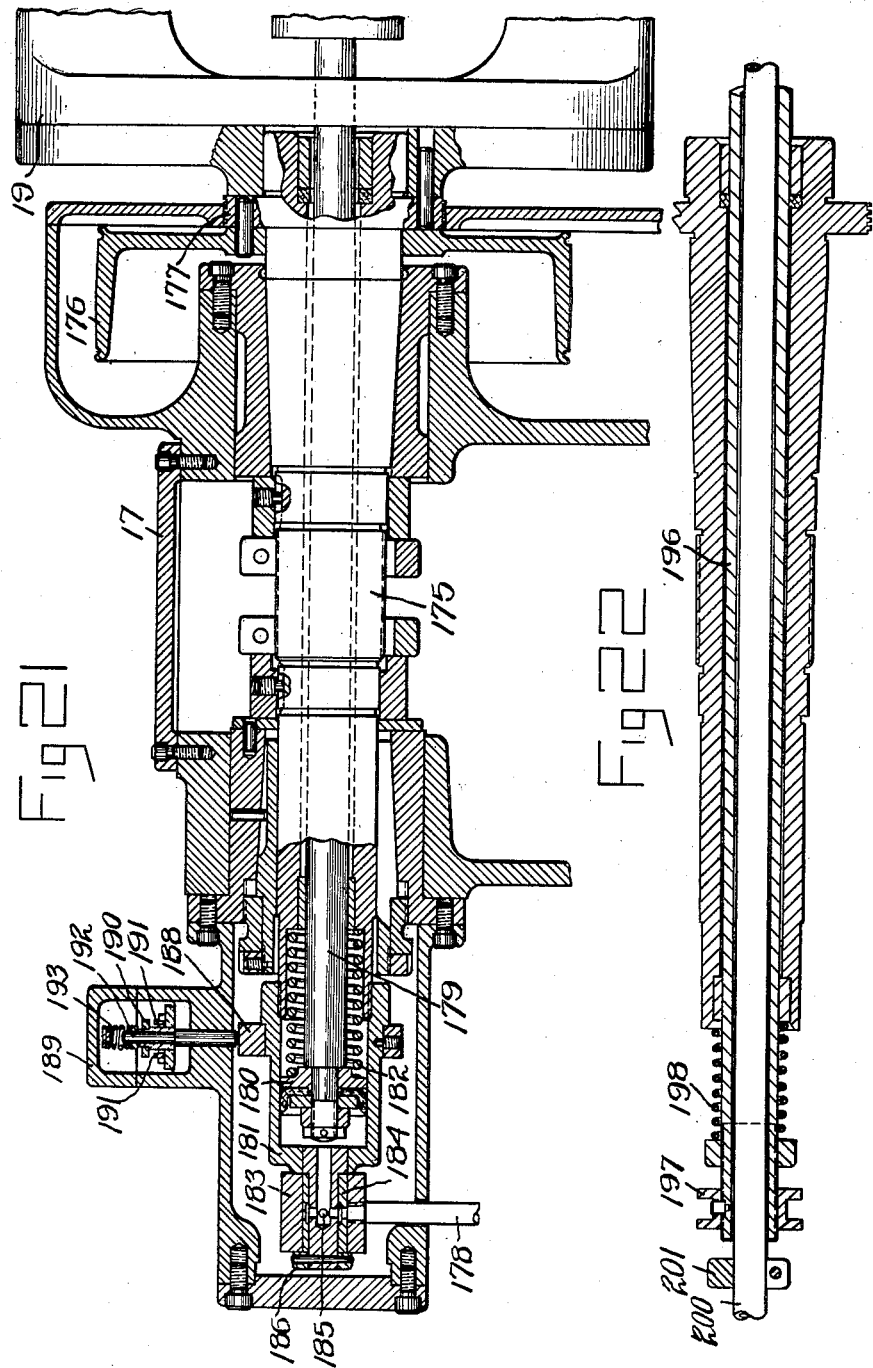

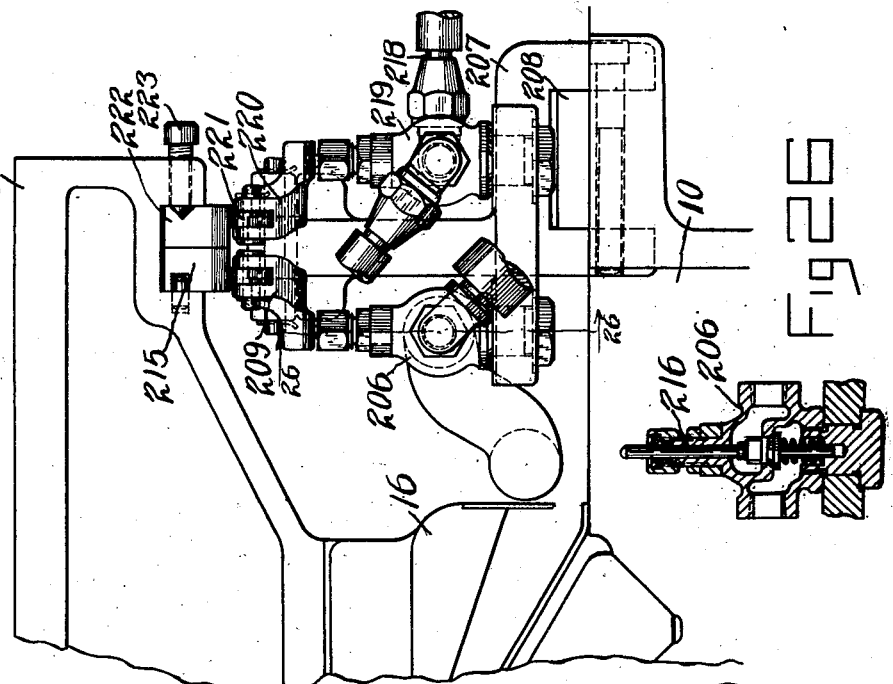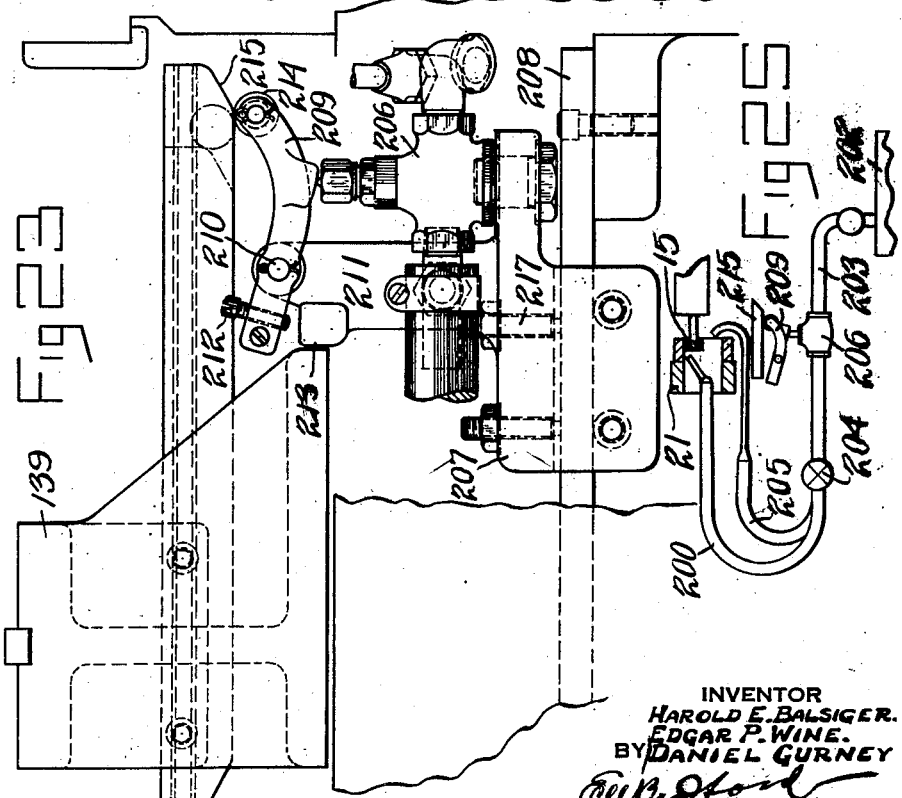

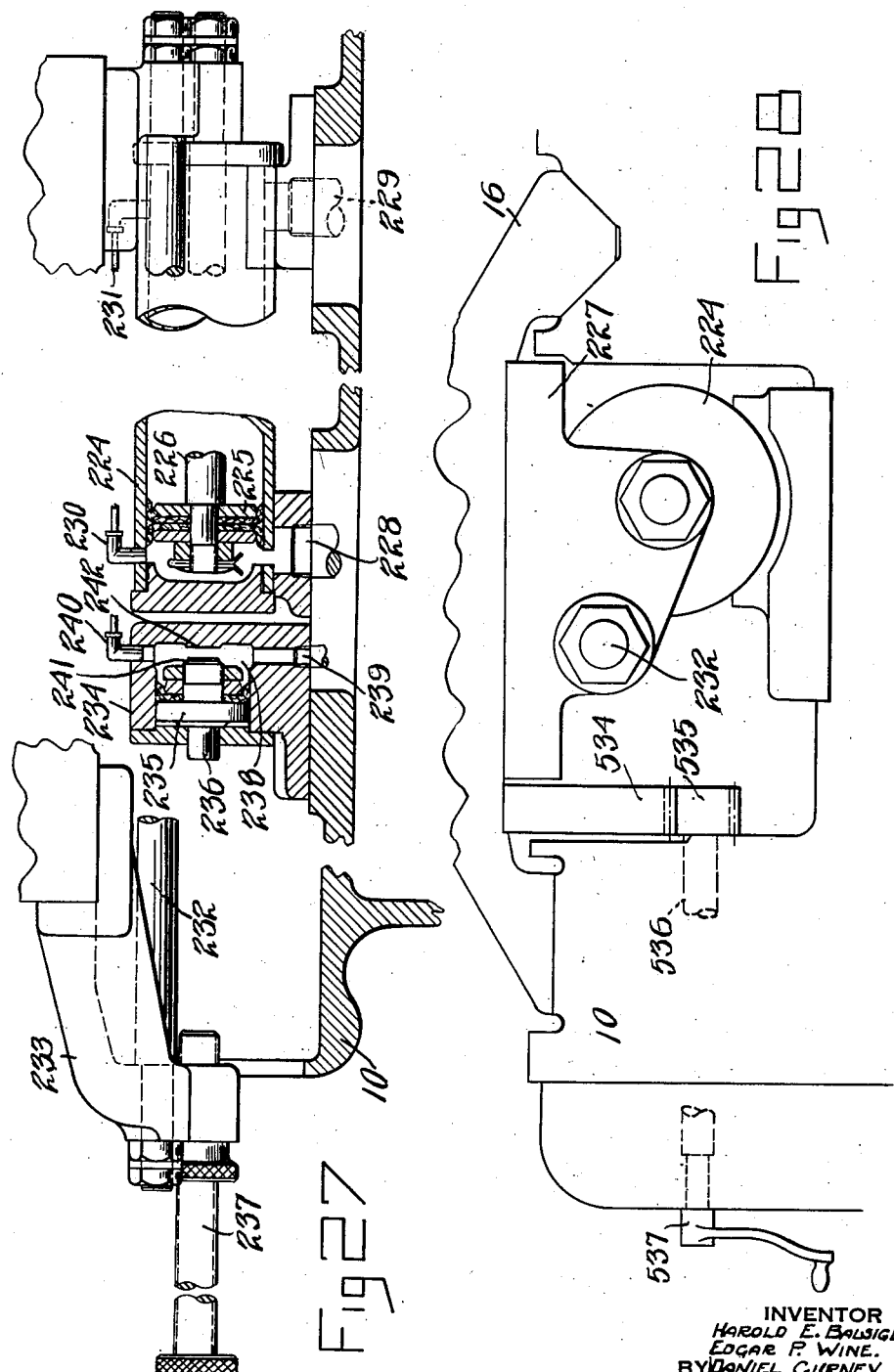

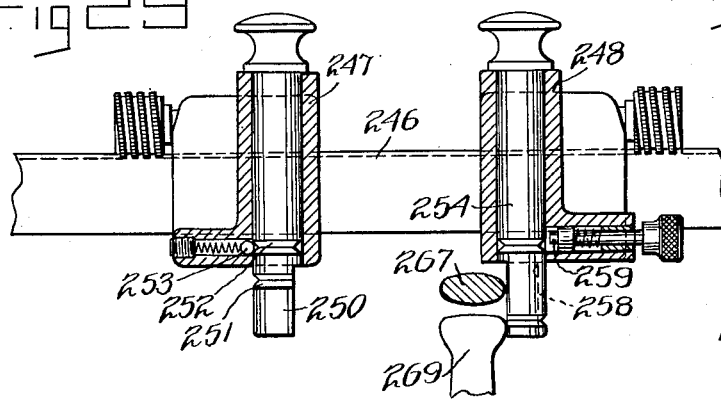
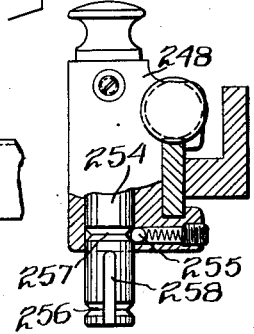
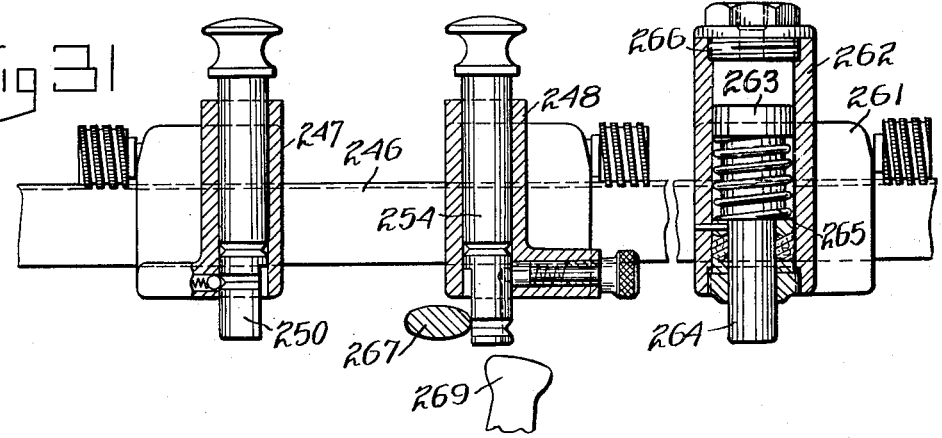
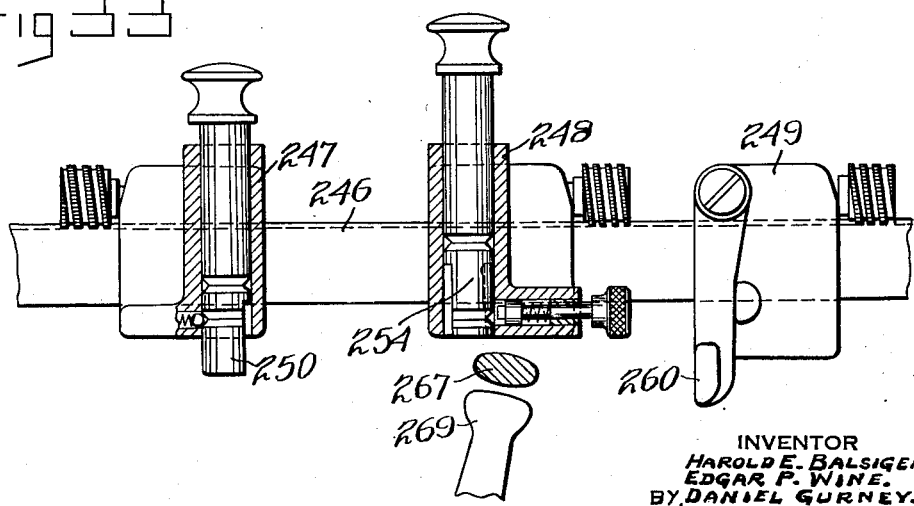

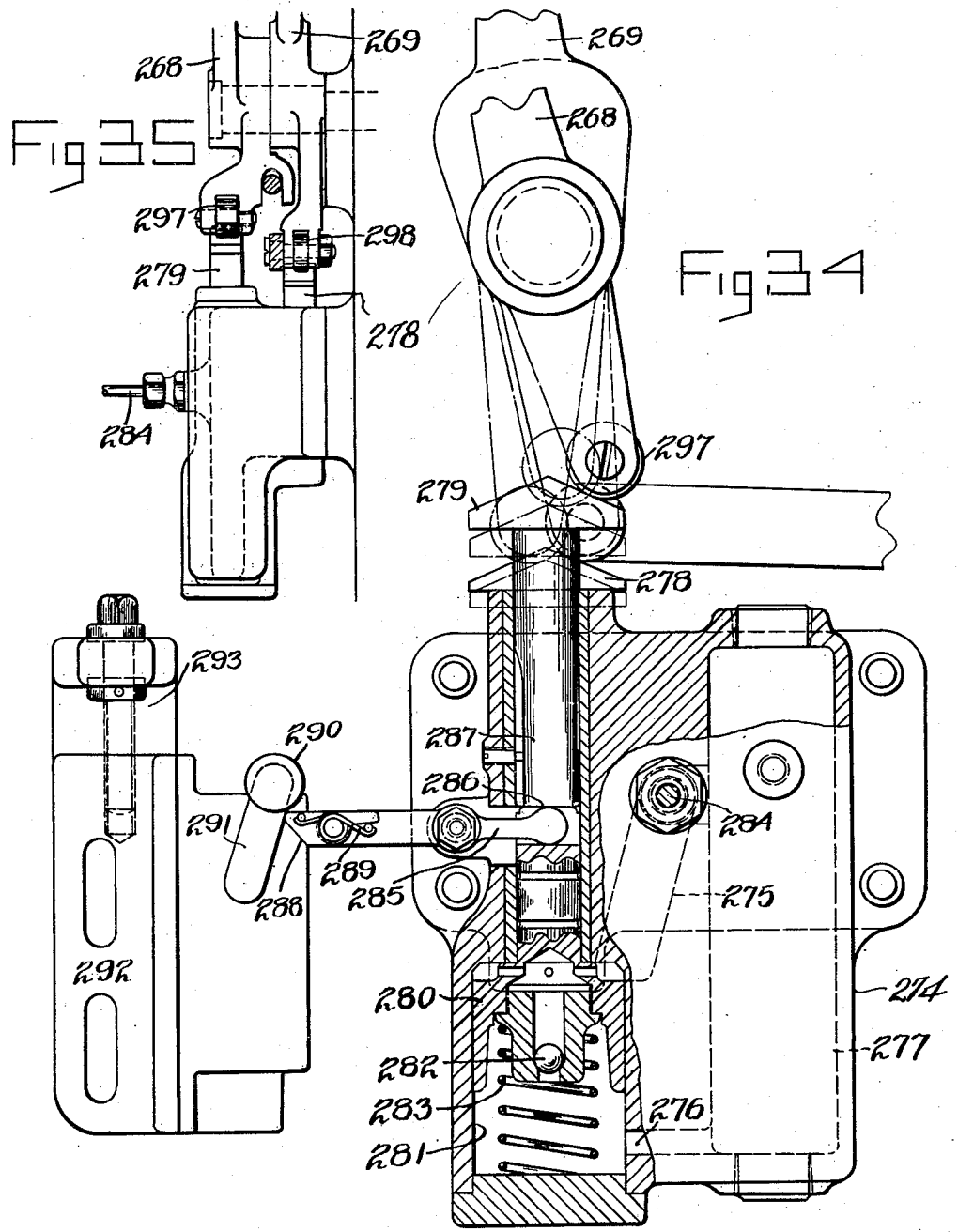

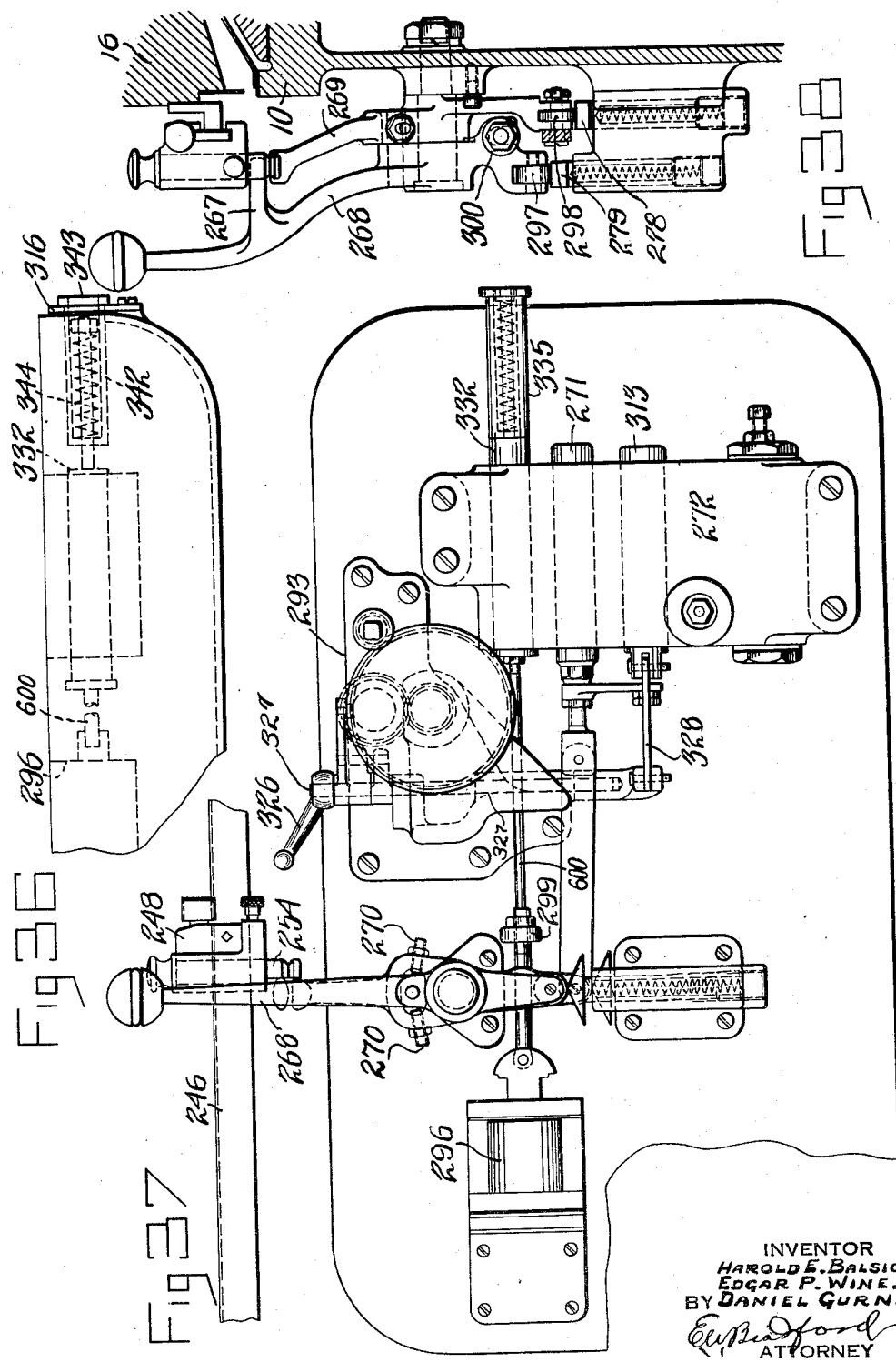

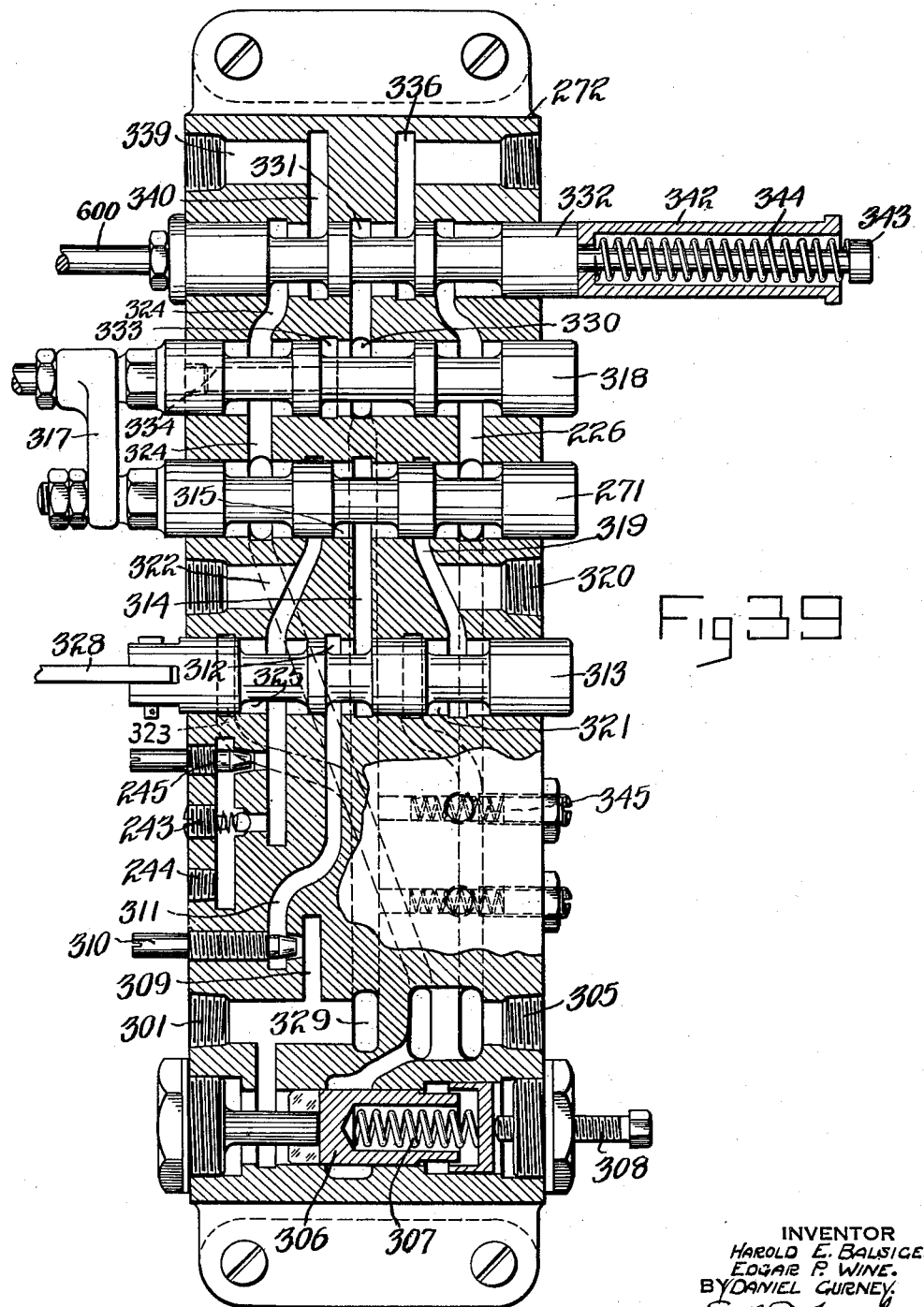

Aug. 3, 1937.  H. E. BALSIGER ET AL  2,088,682
INTERNAL GRINDER
Filed Aug. 5, 1933    29 Sheets-Sheet 23
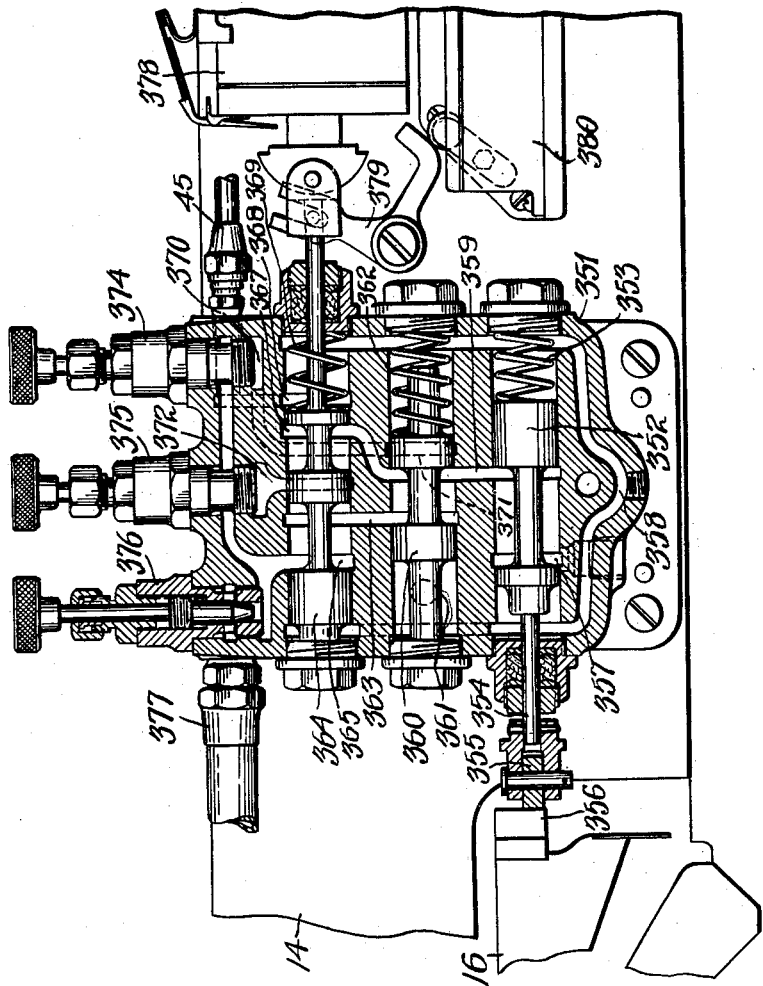
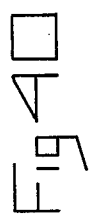
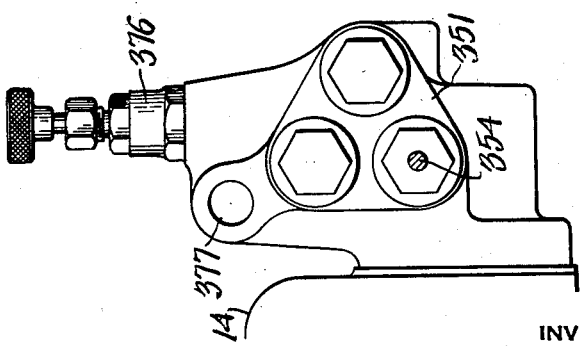
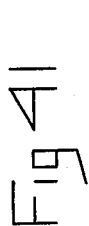
INVENTOR
HAROLD E. BALSIGER.
EDGAR P. WINE.
BY DANIEL GURNEY.
ATTORNEY

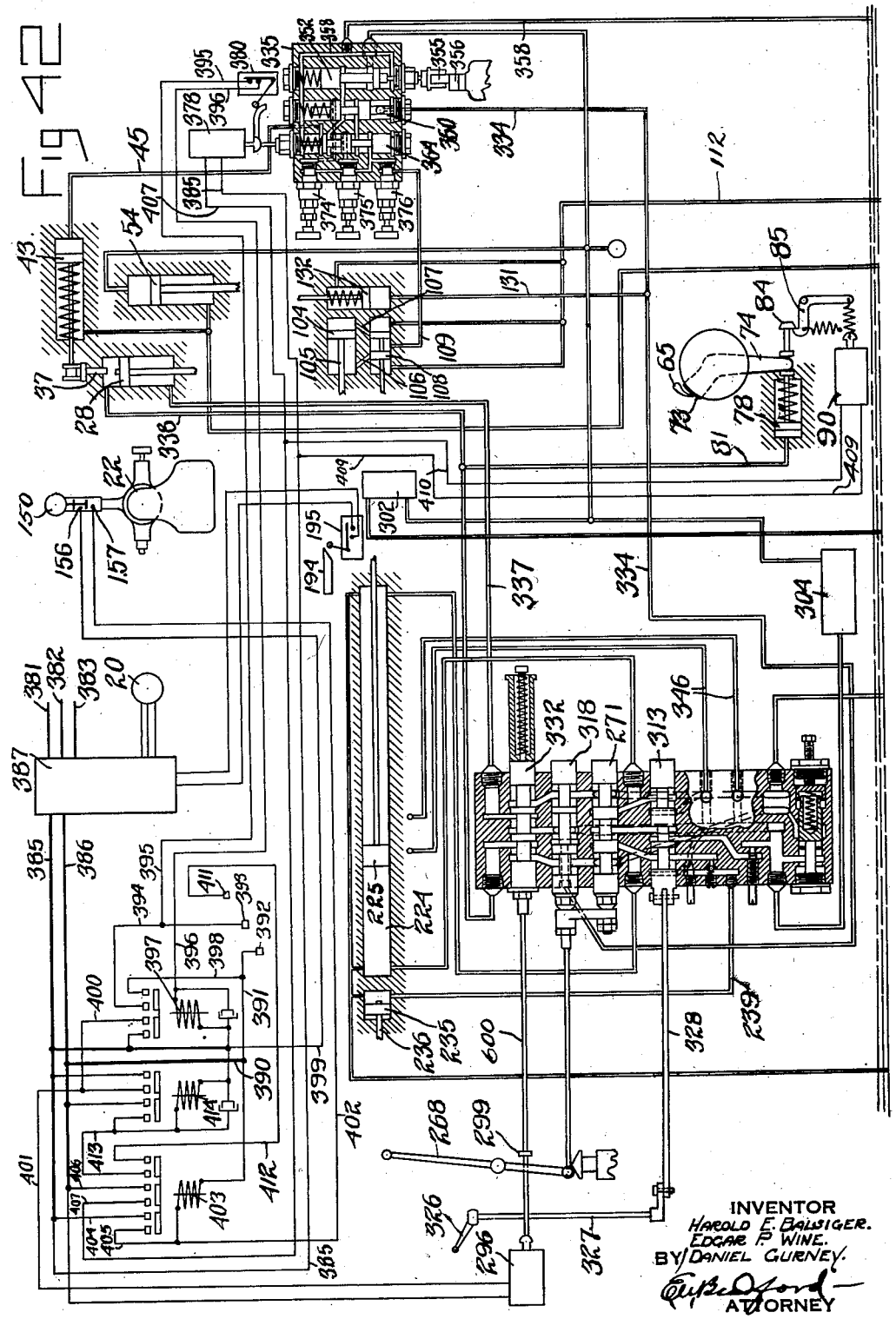

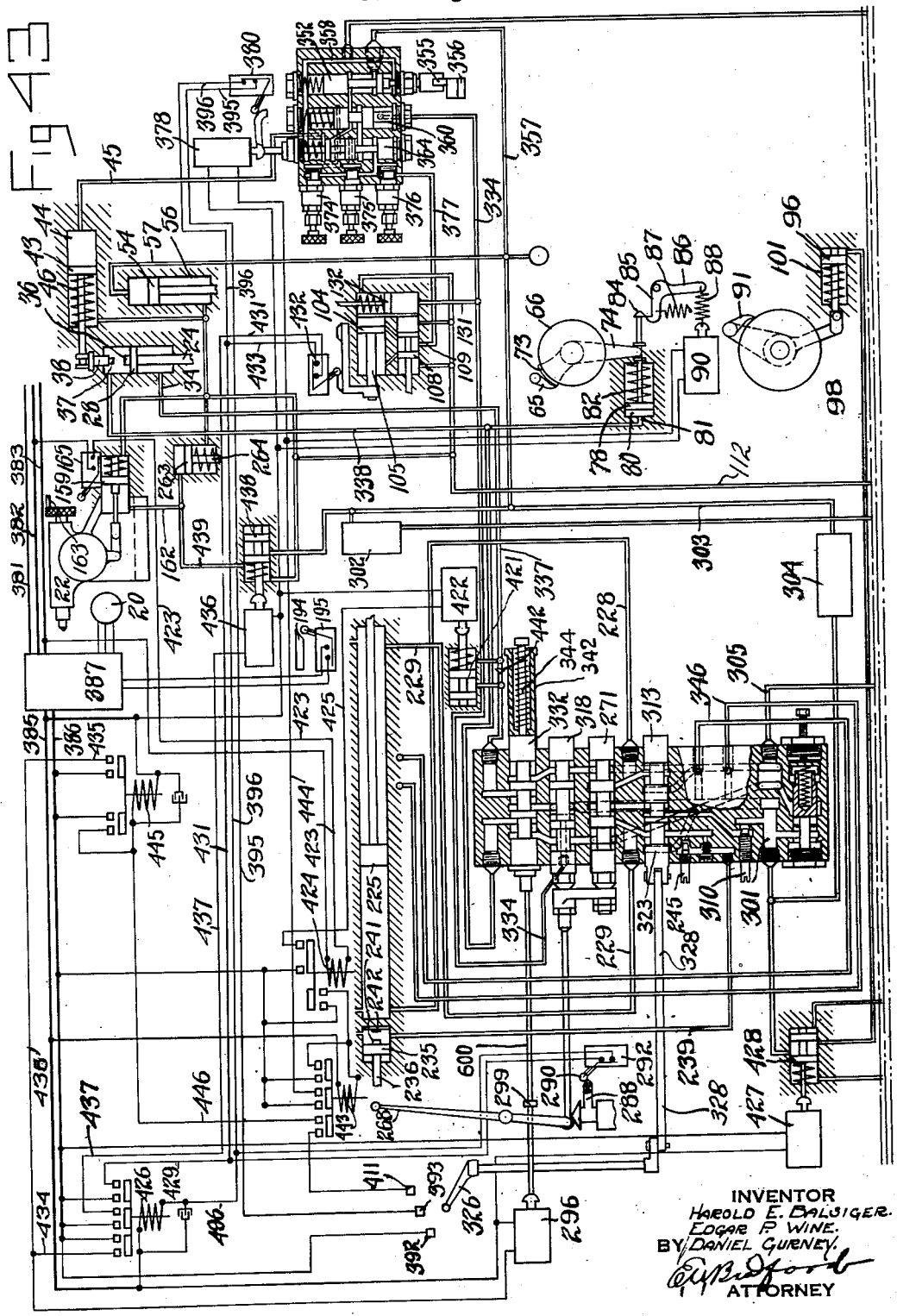

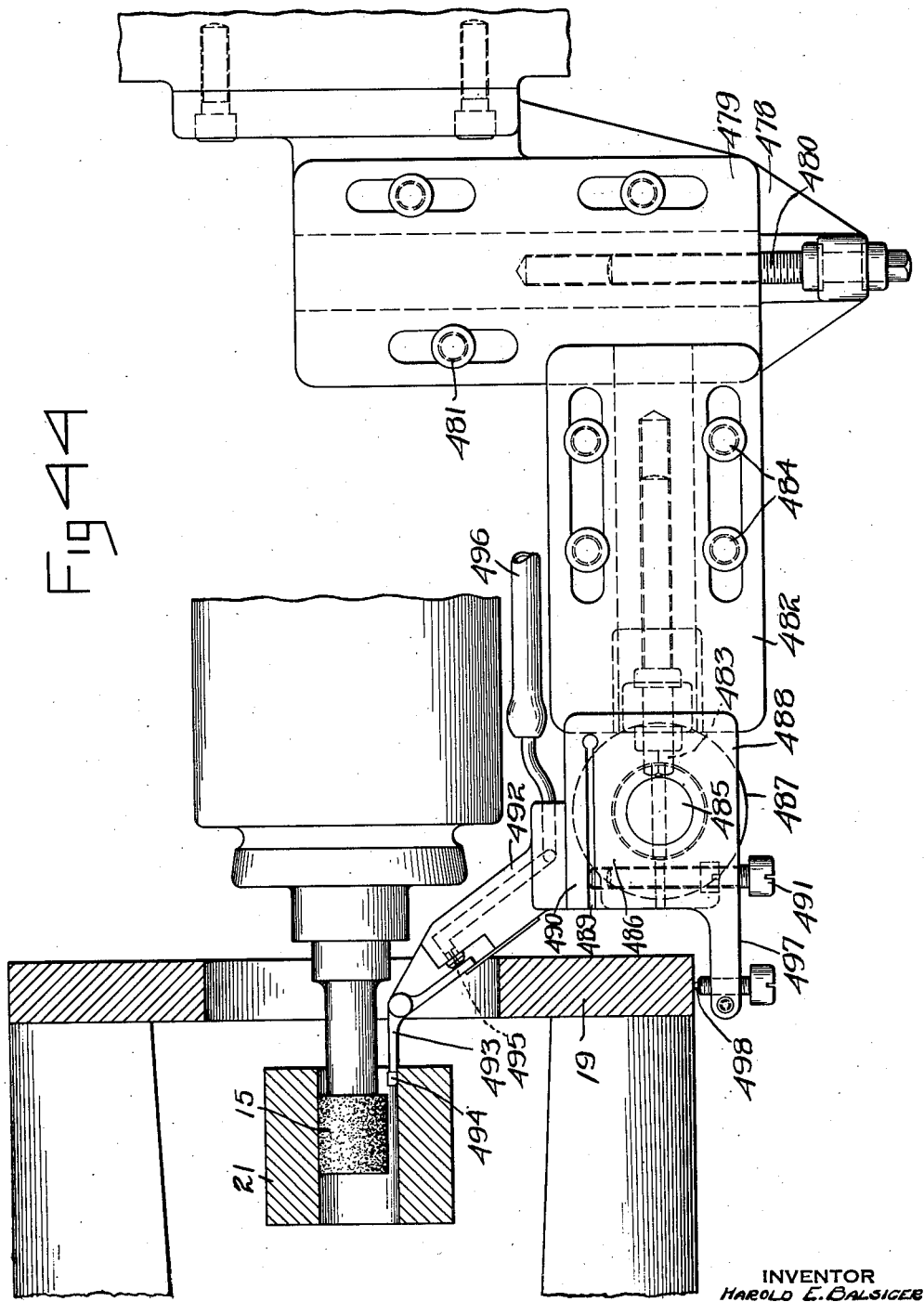

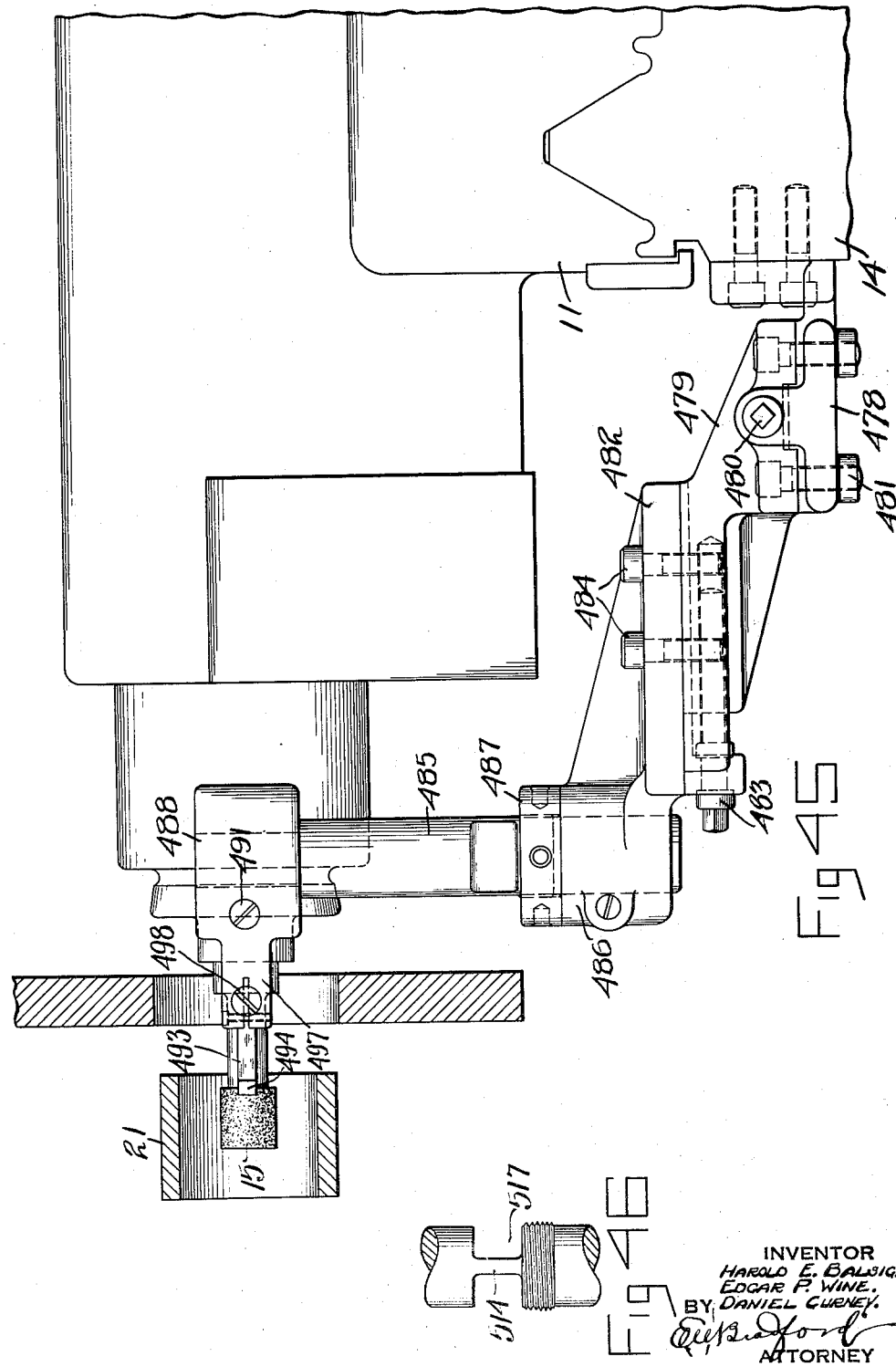

Aug. 3, 1937. H. E. BALSIGER ET AL 2,088,682
INTERNAL GRINDER
Filed Aug. 5, 1933 29 Sheets-Sheet 28
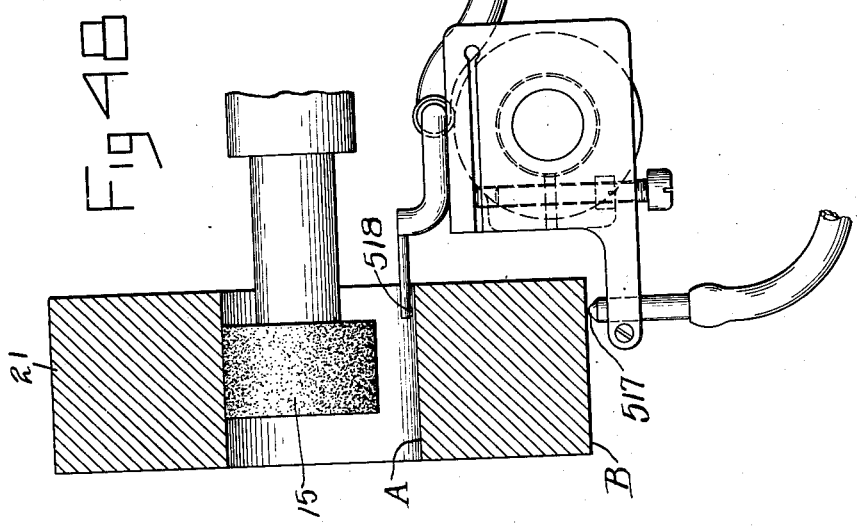
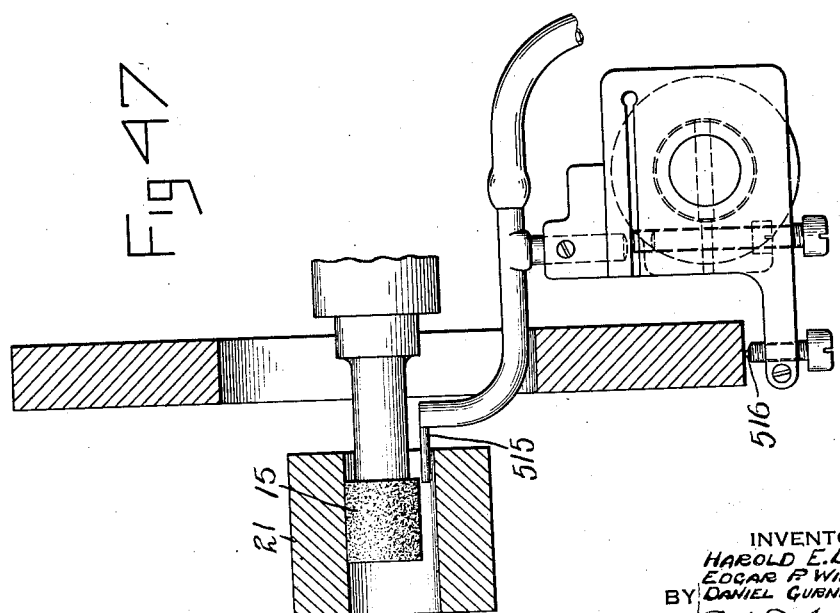

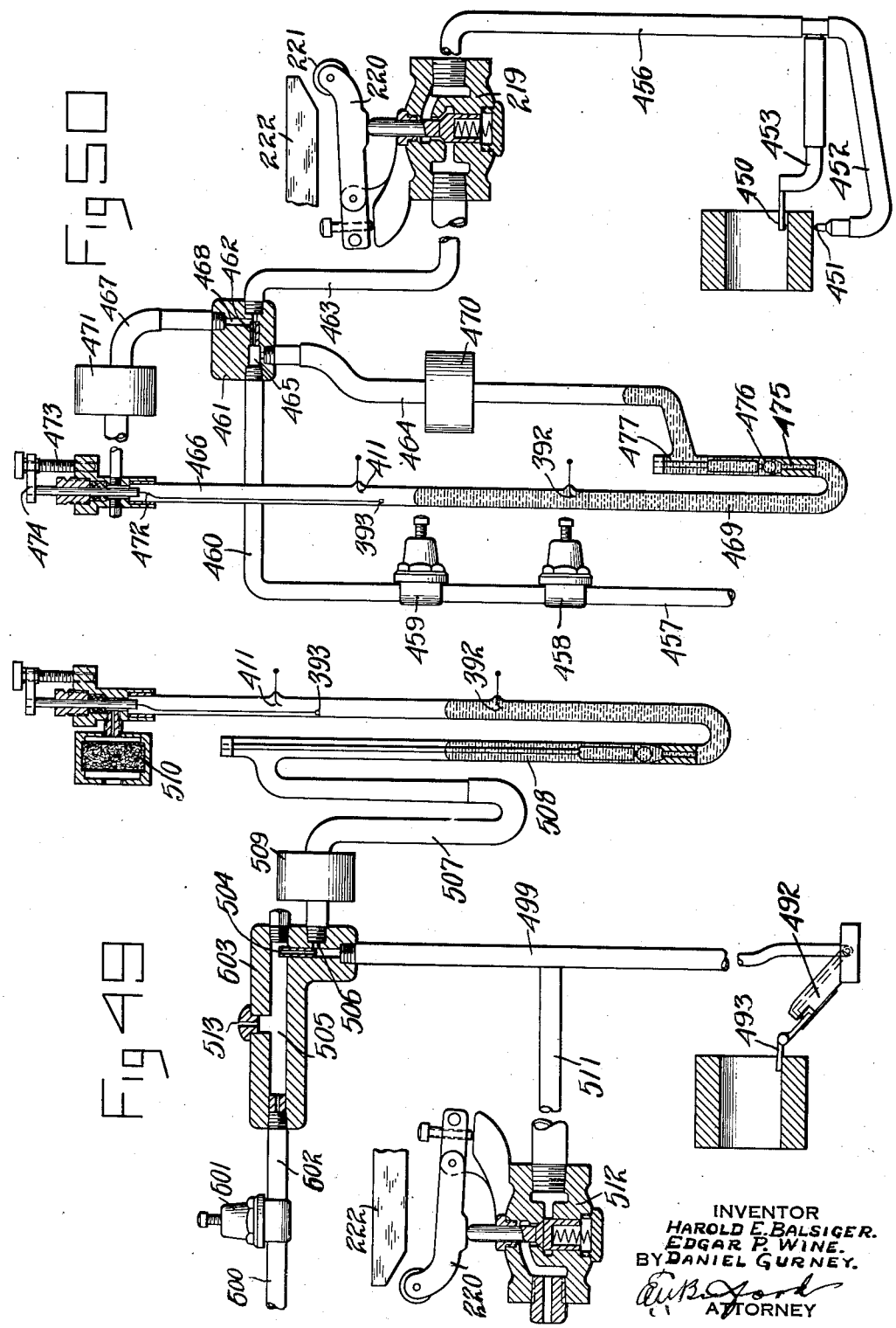

Patented Aug. 3, 1937

2,088,682

UNITED STATES PATENT OFFICE 2,088,682

INTERNAL GRINDER

Harold E. Balsiger, Edgar P. Wine, and Daniel Gurney, Waynesboro, Pa., assignors to Landis Tool Company, Waynesboro, Pa., a corporation of Pennsylvania Application August 5, 1933, Serial No. 683,864

13 Claims. (Cl. 51—50)

This invention relates to internal grinding machines and its object is to provide a machine which will be substantially automatic in operation but one in which some of the mechanism may be at least partially manually operated if desired.

A further object of the invention is to provide pressure fluid sizing device control for one or more of the operations of the machine.

A still further specific object is to provide a machine in which either the work carriage or the wheel carriage may be reciprocated during grinding depending on the nature of the work.

Further objects and advantages will become apparent from the description which follows:

Referring to the accompanying drawings which are made a part hereof and on which similar reference characters indicate similar parts, Figure 1 is a front elevation of the machine.

Figure 3 is a plan view.

Figure 4 is a sectional plan view of the hydraulic wheel feed mechanism.

Figure 5 is a front elevation partly in section of mechanism for operating a wheel base stop.

Figure 6 is an end elevation of the hydraulic wheel feed mechanism.

Figure 7 is a front elevation of the automatic feed mechanism for a manually operated machine.

Figure 8 is a plan view of the automatic feed mechanism.

Figure 9 is an end elevation of the automatic feed mechanism partly in section.

Figure 10 is a front elevation partly in section of the automatic feed mechanism for an automatic machine.

Figure 11 is an end elevation of the feed mechanism of Figure 10.

Figure 12 is a plan view partly in section of the wheel reciprocating mechanism.

Figure 12a is a view of the reversing dogs rotated to remove the center dog from operative position.

Figure 13 is an end elevation of the wheel reciprocating mechanism.

Figure 14 is an end elevation of the reversing lever with the center dog in inoperative position.

Figure 15 is a rear view of said lever.

Figure 16 is an end elevation showing the center dog in operative position.

Figure 17 is a front elevation of the wheel reciprocating mechanism.

Figure 18 is an end elevation of a hand operated wheel dressing mechanism.

Figure 19 is an end elevation of an automatic wheel dressing mechanism.

Figure 20 is an end elevation of a portion of said automatic mechanism.

Figure 21 is a front sectional elevation of the headstock spindle and associated mechanisms for use on an automatically operated machine.

Figure 22 is a sectional view of the head stock spindle for a manually operated machine.

Figure 23 is a partial front elevation with a portion of the bed, broken away to show mechanism for operating the air and water valves.

Figure 24 is a partial end elevation of said valves and associated parts.

Figure 25 is a diagrammatic sketch of the coolant system.

Figure 26 is a cross section of one of the valves for example, on line 26—26 of Figure 24.

Figure 27 is a partial front elevation of the work carriage traverse mechanism partly in section.

Figure 28 is a partial end elevation showing said traverse mechanism.

Figure 29 is a view showing the work carriage reversing dogs in position to engage both reversing levers.

Figure 30 is an end elevation of the right hand dog.

Figure 31 is a view showing said dogs in position to engage only one reversing lever.

Figure 32 is a sectional elevation of a fluid operated dog which may be substituted for the right hand dog of Figures 29 and 31 when the machine is to be operated automatically.

Figure 33 shows the reversing dogs and the dog for stopping the work carriage in loading position, the right hand reversing dog being withdrawn so as to pass over the reversing levers.

Figure 34 is a front elevation of a device to time the dressing operation.

Figure 35 is an end elevation of said device.

Figure 36 is a partial plan view of the control mechanism.

Figure 37 is a front elevation of the control mechanism.

Figure 38 is an end elevation of the reversing levers.

Figure 39 is a sectional view of the control valve.

Figure 40 is a sectional view of the valve which controls the reciprocation of the grinding wheel.

Figure 41 is a front elevation of said valve.

Figure 42 is a combined wiring and piping diagram for a manually operated machine.

Figure 43 is a combined wiring and piping diagram for an automatically operated machine.

Figure 44 is a plan view of a sizing device having one feeler in the work and one on the periphery of the face plate.

Figure 45 is a front elevation of the device shown in Figure 44.

Figure 46 is a detail of the upright support for the feelers.

Figure 47 is a plan view of a sizing device having an air nozzle in the work and a feeler on the periphery of the face plate.

Figure 48 is a plan view of a sizing device having an air nozzle in the work and another nozzle directed against the periphery of the work.

Figure 49 is a diagram of a complete sizing device of the type shown in Figure 44.

Figure 50 is a diagram of a complete sizing device of the type shown in Figures 47 and 48.

Figure 1:
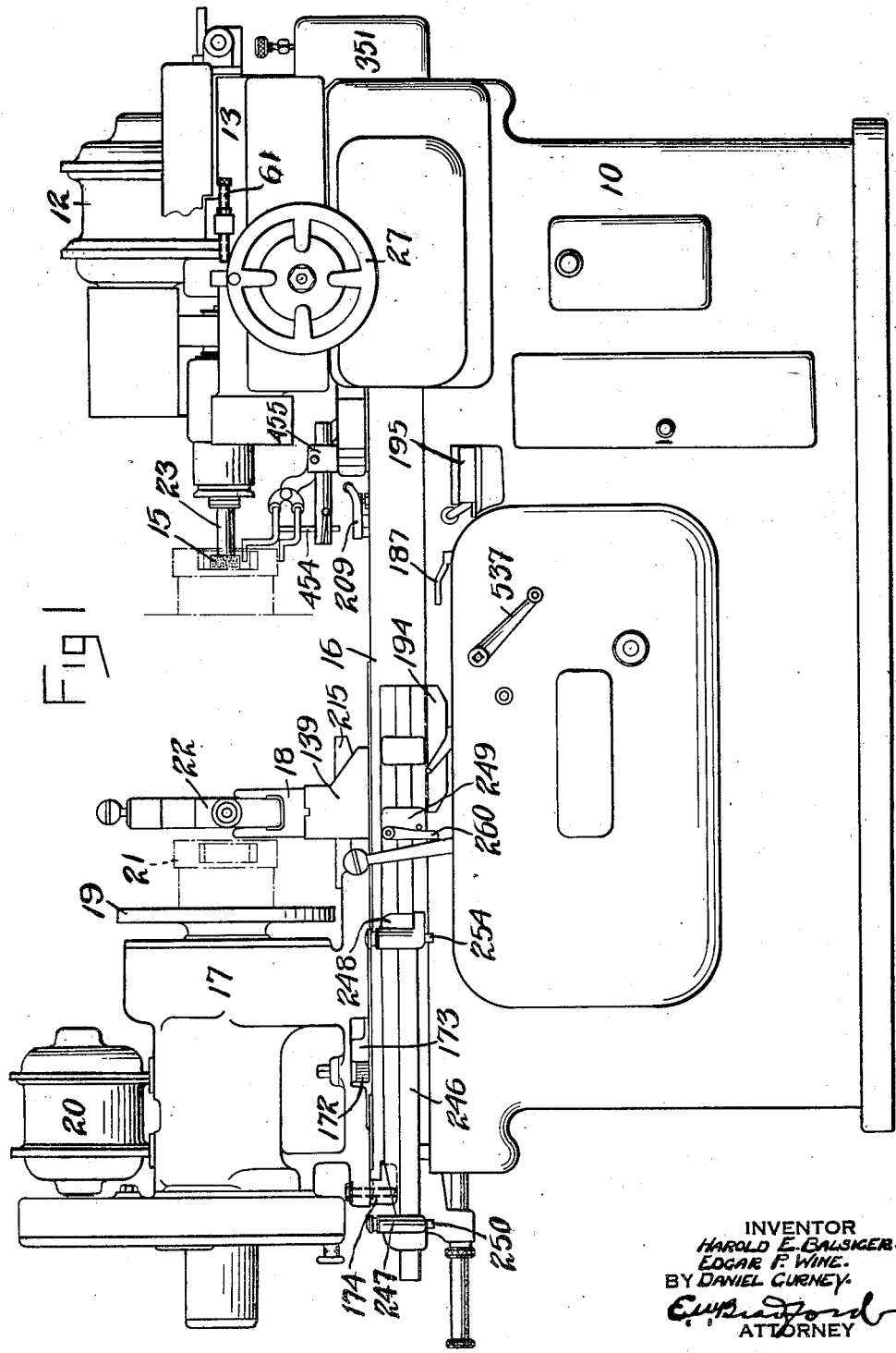
Figure 2:
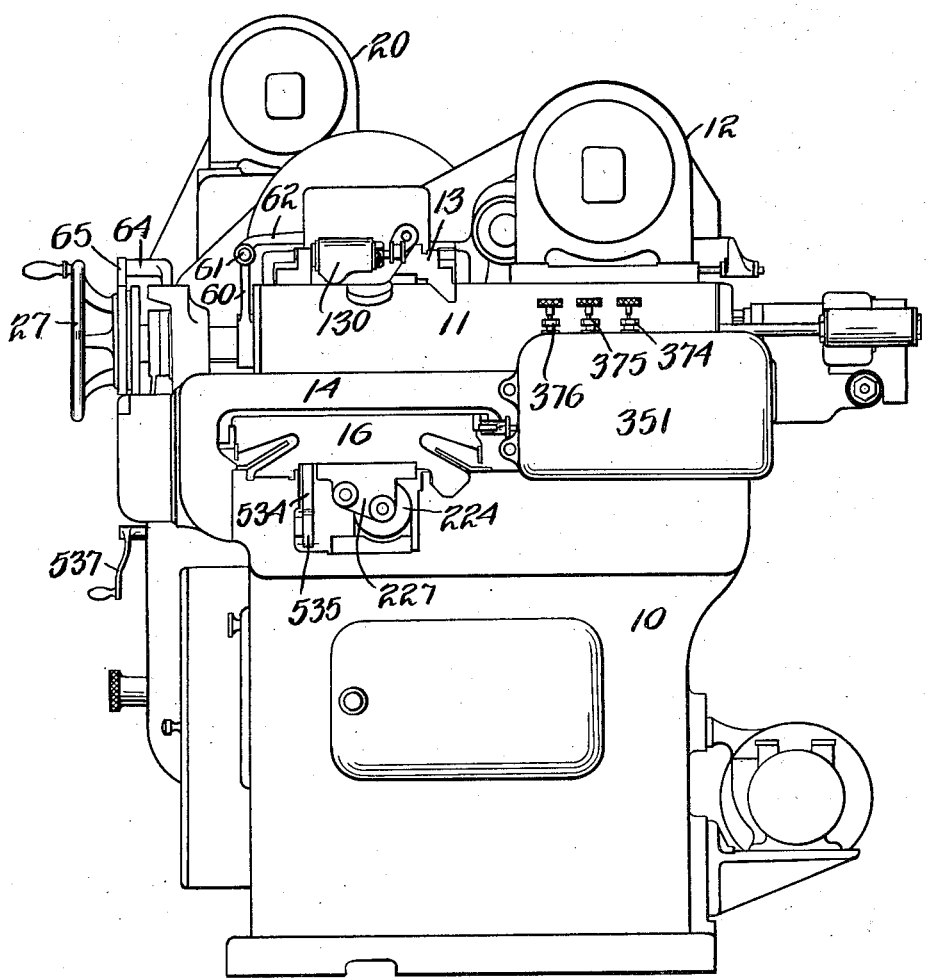
Figure 2 is an end elevation.

Our machine is designed for either manual or automatic operation. Change from a manual to an automatic machine is made by making a few minor changes in the wiring and piping.

Operation of the machine as a hand operated machine does not mean that the individual functions of the machine are performed manually but that manually operated mechanism may control several functions, either directly or indirectly. The operator starts the grinding operation by shifting a reversing lever to cause the work carriage to move into grinding position. The reversing lever also causes fluid to be directed to other parts of the machines. The movement of the carriage closes a switch through which current passes to further control said fluid by means of solenoid valves. The carriage also actuates a valve directly to start the reciprocation of the wheel carriage.

The rough grinding operation proceeds until checked by a sizing device which backs the wheel away from the work. The operator shifts the reversing lever to withdraw the work from the wheel. This causes a change in the speed and length of the wheel reciprocating movement for the purpose of dressing the wheel. The operator dresses the wheel manually and at the same time changes the stop position for the wheel feed. After the wheel has been dressed the work is returned to grinding position and the finish grinding operation proceeds until the sizing device causes the grinding wheel to back away from the work. The work carriage is again shifted to inoperative position, the finished work removed and the machine is in readiness to grind the next piece.

The sequence of operations for an automatic machine is the same as for a hand operated machine except that they are performed automatically. In an automatic machine the operator of course must start the machine and load and unload the chuck.

In the drawings numeral 10 indicates the bed of the machine within which are provided a reservoir for oil for operating the hydraulic mechanism of the machine and a water reservoir for containing coolant for the grinding wheel, and pumps for circulating these fluids, the same being the usual devices well known in grinding machines. Upon the bed 10 is a wheel base 11 having a motor 12 mounted thereon for driving a shaft 23 carrying a grinding wheel 15. The grinding wheel shaft is rotatably mounted on a wheel carriage 13 which is slidably mounted on the wheel base 11 and the wheel base in turn is mounted on a slide 14. The slide 14 forms a bridge under which a work carriage 16 traverses. The work carriage 16 carries a head stock 17 mounted thereon which head stock carries a work holding fixture 19. Work 21 is held in the work holding fixture 19 by mechanism later to be described and is rotated by a motor 20. A wheel dressing device 22 is rigidly mounted upon a base 18 mounted on the work carriage and is manually or automatically moved into wheel dressing position by mechanism later to be described. Both the wheel carriage and the work carriage are movable longitudinally of the bed of the machine and either may be reciprocated during the grinding operation depending on the character of the work operated upon. The range of reciprocation of the wheel carriage is considerably less than that of the work carriage. It is found more convenient therefore to reciprocate the wheel carriage for grinding relatively shallow work and reciprocating the work carriage for grinding deep work.

A cycle of operations consists in positioning the work in the chuck and moving the work carriage to grinding position. The wheel carriage is then moved to bring the grinding wheel into contact with the work. In the machine illustrated the rear side of the grinding wheel actually performs the grinding so that the wheel carriage is moved from the front toward the rear during the grinding. The grinding wheel is manually moved into grinding contact with the work after which the grinding feed is automatically effected. A sizing device controls the machine to stop rapid feed when the work has reached approximately its finished size. This sizing device causes the wheel to move out of contact with the work and the work carriage to withdraw the work from grinding position. After rough grinding the wheel is dressed for finishing grinding. The wheel dressing mechanism may be manually or automatically moved to dressing position as will later appear. When the wheel has been dressed the wheel carriage returns to grinding position and the work carriage moves the work into correct grinding position after which the work is ground to its finished and polished condition. When it has reached its finished size the sizing device causes withdrawal of the wheel from the work and controls withdrawal of the work carriage from grinding position at which the finished work may be moved and a new piece to be ground inserted in the machine. The several mechanisms just mentioned will be described in detail and in combination with other mechanism with which they co-operate.

*Wheel feeding mechanism*

Wheel feeding mechanism is illustrated in Figures 4 to 11 inclusive. Feeding of the grinding wheel toward the work is effected by means of a feed screw 24 which is threaded through a nut 25, carried in a bracket 26 which is mounted on the wheel base 11. This feed screw may be manually rotated by means of a hand wheel 27 and may also be automatically operated as will later appear. The inner end of the feed screw 24 is rotatably mounted in a piston 28. The operative connection between the piston and the feed screw is through a ball bearing assembly 29, the feed screw being held upon the ball bearing assembly by nuts 30. Piston 28 operates in cylinder 31 which is attached to the slide 14 and is therefore fixed to the bed of the machine. The ball bearing assembly provides free rotation of the screw 24 independently of piston 28 and reduces friction. Pressure fluid is supplied to the chambers 32 and 33 at the front and rear of the piston 28 through ports 34 and 35. Fixed in the rear end of the piston 28 is a stop 36 adapted to engage the stop 37 which is fixed in the forward end of an adjustable screw 38. To move the wheel into grinding position the piston 28 is moved by pressure fluid in the chamber 32 to bring stop 36 to engage the stop 37. The piston is held in this fixed position during the grinding, the wheel being moved for a grinding feed by rotation of the feed screw 24. When the grinding operations are completed, fluid pressure entering through the port 35 moves the piston forward until the front edge of the piston engages against a stop at 39. During the grinding operation there is a tendency for the shaft which carries the grinding wheel to flex under the pressure which is put upon it to hold the grinding wheel in rough grinding contact with the work and the wheel support moves to a more advanced position than if the shaft was more rigid. For finished grinding the grinding wheel will be held under less pressure and hence there will be less flexing of the shaft. It is also desirable that there will be no flexing of the shaft during dressing of the grinding wheel; with less flexing of the shaft the wheel support may be moved to a less advanced position than for a rough grinding and still bring the wheel against the work or the dressing tool. After rough grinding therefore means are provided for moving the stop 37 forward to reduce the distance between stop 36 and 37 to limit the rearward position of the piston 28. This means consists of the adjustable screw 38 having attached to its rear end an arm 40 which is connected to a spool 41 on a piston rod 42, connected to a piston 43 operating in a cylinder 44. Pressure fluid is supplied to cylinder 44 through a pipe 45 to rotate the screw 38 clockwise as shown in Figure 5 to move the screw 38 toward the stop 36. The piston 43 is returned to its normal position by means of spring 46. Leakage past the piston 43 is permitted to drain out through a port 47. Movement of the rod 42 is limited by a stop screw 48 which is locked in adjusted position by a clamp 49. A rod 50 has one end threaded into the wheel base 11 and carries nuts 51 which engage a lug 52 on the slide 14 to limit forward movement of the grinding wheel base to prevent the grinding wheel from being moved manually to contact with the forward side of the work. A rod 53 is attached to bracket 26 on the wheel base 11. This rod carries a piston 54 which operates in a cylinder 55. Pressure fluid is supplied to the rear side of the piston 54 through a pressure fluid line 56. Fluid which may leak past the piston 54 is permitted to drain through fluid line 57 back to the oil reservoir. The purpose of the mechanism just described is to maintain a forward pressure on the wheel base to take-up back lash about the screw threads on the feed screw 24. Fluid under constant pressure from the supply pump is always acting against the rear side of the piston 54 and imposes a tension between the feed screw 24 and the nut 25, thus eliminating back-lash.

The forward end of the feed screw 24 carries a sleeve 59 having an arm 60 secured upon one end, said arm being engageable by a dog 61 carried in a yoke 62 upon the grinding wheel carriage 13. The arm 60 is movable in one direction by axial movement of the wheel carriage and is returned by spring 63. The forward end of the sleeve 59 carries an arm 64 having a pawl 65 mounted thereon, said pawl engaging the teeth of a ratchet wheel 66. The ratchet wheel 66 is rigidly mounted on the hand wheel 27. Also mounted on the hand wheel 27 are gears 67 and 68, these gears being rotatably mounted upon a pin 69 fixed in the hub of the hand wheel. The gear 67 engages a stationary gear 70 while gear 68 engages a gear 71 which is keyed to the feed screw 24. The hand wheel 27 is rotatably mounted by means of ball bearings 72 upon the forward end of the feed screw 24. Upon forward movement of the wheel carriage, the arm 60 is rocked in one direction and this movement through the operative connection described, rotates the hand wheel about the end of the screw feed 24 and causes the gears 67, 68, 70 and 71 to rotate the feed screw in the opposite direction from that in which the hand wheel is rotated. The stroke made by the pawl 65 is always the same for each reciprocation of the wheel carriage. The effective stroke, however, is controlled by the number of teeth on the ratchet wheel 66 which are engaged by the pawl. To control the number of teeth engaged a shield 73 is movable between the end of the pawl and the periphery of the ratchet wheel. The shield 73 is mounted on a carrier 74 which has an arm 75 engaging a spool 76 upon a rod 77. The rod carries a piston 78 operating in a cylinder 79. Pressure fluid is supplied to the chamber 80 at the rear of the piston through a port 81. The piston is returned by a spring 82. Any leakage of fluid past the piston 78 may pass out through port 83. When pressure fluid is supplied to the port 81 the carrier 74 is moved counterclockwise, viewing the mechanism as in Figure 7, to move the shield 73 beneath the end of the pawl 65 to prevent operation of the ratchet wheel by movement of the wheel carriage and thereby prevent feeding the wheel toward the work.

The rod 77 carries also a dog 84 engageable by a latch 85 on a rock lever 86. A spring 87 is attached to one end of the lever for moving the latch out of engagement with the dog 84. The lower end of the lever is connected by means of a link spring 88 with a plunger 89 in a solenoid 90. The dog 84 is adjustable on the rod 77 so as to control the position of the shield 73 when engaged by the latch 85.

In operation when the work has been reduced to its rough size, mechanism later to be described, causes pressure fluid to enter port 35 to withdraw wheel from the work. Port 81 is in communication with fluid line which supplies pressure fluid to port 35 to withdraw the wheel from the work. Pressure fluid acts against piston 78 to move shield 73 between ratchet 65 and wheel 66 so as to stop rotation of the feed screw. By means of fluid pressure mechanism later to be described, the wheel carriage is moved to wheel dressing position. During the dressing of the wheel the solenoid 90 is energized so that the latch is placed in the path of the latch dog 84. When dressing of the wheel is completed and the work advances for finished grinding, fluid is released from chamber 80 and pressure of the spring 82 returns the piston 78 to the rear until the latch dog 84 is engaged by the latch 85. The latch prevents movement of the rod 77 further to the left and so positions the shield 73 so that only a few of the ratchet teeth may be engaged by the pawl 65. This therefore limits the rate of feed of the wheel into the work during the finishing or polishing of the work. Dog 84 may be adjusted along the shaft 77 to control the number of ratchet teeth engaged by pawl 65 and therefore control the rate of feeding as desired.

When the work has been reduced to its finished size, and pressure fluid supplied to rear of piston 28, the shield 73 will again be interposed between the pawl 65 and the ratchet wheel and thus stop further feeding of the work. As the work is moved out to unloading position, the circuit to solenoid 90 is broken permitting spring 87 to pull the latch 85 out of the path of the dog 84. The shield 73 may now be returned to its original position by means of the spring 82.

Automatic wheel feed

In the form of wheel feeding shown in Figures 7, 8 and 9, the grinding wheel is moved back out of grinding position by manual rotation of the hand wheel 27. Mechanism may be provided for automatically resetting the grinding wheel and such mechanism is shown in Figures 10 and 11. All parts are the same as those shown in Figures 7, 8 and 9 except the mechanism for automatically resetting the wheel to a position for beginning grinding. Only the additional elements therefore need be described in the modified form. As shown in Figures 10 and 11 a ring 92 on the hand wheel carries an arm 91, the lower side of this ring having a gear segment 94 engageable by a rack 93 formed upon rod 95. Rod 95 has a piston 96 operating in a cylinder 97. Pressure fluid is supplied to the right of the piston in Figure 10 through port 98 to move the rack to the left. The arm 91 carries a pawl 99 engageable with ratchet teeth on a ratchet wheel mounted upon the hand wheel 27. When pressure fluid is applied through port 98 to the right of piston 96 the arm 91 is moved clockwise as viewed in Figure 10 and with engagement of pawl 99 with the ratchet wheel the feed screw 24 is rotated through the gear cluster in a counterclockwise direction to reset the grinding wheel from the work. The rod 95 is limited in its movement by a stop screw 100. The stop screw 100 is adjustable so as to regulate the extent of rotation of the pawl 99. A shield 102 is adjustably secured by screws 703 to the hand wheel and the shield is so positioned that during engagement of the pawl 65 with the ratchet wheel 66 the pawl 99 is held out of engagement with its ratchet wheel. Pawls 65 and 99 are both disengaged from their respective ratchet wheels when in normal position thus allowing the hand wheel 27 to be turned freely in either direction.

Mechanism for reciprocating wheel carriage

Mechanism for reciprocating the wheel carriage is shown in Figures 12 to 17 inclusive. As previously stated, when grinding shallow work a reciprocating movement is imparted to the grinding wheel. This reciprocating movement is secured by moving the wheel carriage and mechanism for accomplishing this will now be described. A cylinder 103 is formed in the wheel base 11. A piston 104 mounted in this cylinder is connected through a piston rod 105 with the yoke 62 attached to the wheel carriage. Fluid pressure is admitted to alternate ends of the cylinder 103 through ports 106 and 107 and admission of fluid to these ports is controlled by a valve 108. Pressure fluid is admitted to the valve chamber through fluid port 109. Fluid is exhausted through ports 110 and 111 to exhaust line 112. Valve 108 is operated through the valve stem 113 having a spool 114 engageable by one end of a reversing lever 115. Reversing lever 115 is loosely pivotally mounted upon a shaft 122 and has an opening 117 into which project screws 118, 119 which are threaded through the edge of the reversing lever and extend into the opening where they are engaged by a pin 120 on an arm 121 which arm is secured upon said shaft 122, upon the other end of which shaft is secured an arm 123 which carries a hinged lever 124 attached thereto but held in position by means of spring 125. Hinged lever 124 carries a pin 126. The spring permits the lever 124 to move in one direction to permit pin 126 to pass over dogs on a dog shaft 500 as will later appear. The pins 118, 119 are spaced apart so that there is a lost motion between the operating pin 120 and the reversing lever 115. A roller 502 on arm 503 of lever 121 engages the cam surface of the spring pressed plunger 501 to provide a snap action for the reversing valve 108. Dog rod 500 is mounted upon the wheel carriage and has spaced dogs 127, 128 and 129 secured thereon. The dogs 128 and 129 operate the reversing valve during reciprocation of the wheel carriage for grinding. During the dressing operation dog 128 is rendered inoperative and the valve 108 is shifted by dogs 127 and 129. Dogs 127, 128, 129 are adjustable and may be positioned and clamped on the rod 500 to suit various grinding conditions.

Dog 128 is flattened off on one side as shown in Figures 12a and 14 so that pin 126 does not strike it when the dog rod 500 is turned as shown in Figure 12a. This permits the carriage to move for the lengthened stroke during dressing of the grinding wheel. Dog rod 500 is turned by means of fluid pressure in a cylinder 130. Pressure fluid is supplied to the cylinder through fluid line 131. Fluid acting against piston 132 rocks the rod 500 by means of the piston rod 133 having a spool 134 connected to an arm 135 on the dog rod 500. Spring 136 returns the rod 500 and consequently the dog 128 to normal grinding position when fluid is released from the cylinder 130. Any fluid leaking past the piston 132 is returned through drain 137 into the exhaust line 112 then back to the oil reservoir. Dog 128 is provided with a beveled face on one side so that should the dog rod 500 rotate back to normal position for grinding while the pin 126 is positioned between dogs 127 and 128, the lever 124 will ride over the dog 128 and drop into normal position between dogs 128 and 129 without injury to the mechanism where the dogs will continue to control reciprocation of the carriage during normal grinding.

Control of reciprocation of the wheel carriage

A valve for controlling the rate of reciprocation of the wheel carriage is disclosed in Figures 40 and 41. This valve consists of a valve body 351 at the top of which are mounted three throttle valves 374, 375 and 376. Each of these valves is set for a different reciprocating speed and fluid is automatically directed to the proper valve at the proper time. Fluid under pressure enters the valve body through the port 357. This port leads to valve 352 which controls the flow of the fluid to the other parts of the valve. Said valve 352 is moved in one direction by a spring 353 and in the other direction by cam 356 on the work carriage 16 which engages a roller 355 on the valve stem 354. In addition to valve 352 there is a valve 360 operated in one direction by a spring 362 and in the other direction by fluid under pressure which is supplied from valve 318 through port 333 and passage 334 in the main control valve, Figure 39.

A third valve 364 is moved in one direction by spring 369 and in the other direction by solenoid 378. These two valves 360 and 364 cooperate under the control of a sizing or any suitable device for closing an electric circuit and a main control valve to direct fluid to the wheel reciprocating mechanism through one or the other of the throttle valves 374, 375 and 376.

Wheel dressing mechanism

Wheel dressing devices are shown in Figures 18, 19 and 20. Hand operated device 22 is pivotally mounted on a base 18 which is secured to a slide 139 by means of bolts 140 and is adjustable laterally of the slide; the slide in turn is secured by bolts 141 upon the work carriage 16 and is adjustable longitudinally of the carriage. The dressing device has a screw 142 threaded through a lug and secured in position and engageable with a stop portion 143 on the base. A lug 144 engages a stop portion 145 on the base, these lugs determining the limits of pivotal movement of the dressing device upon its mounting. A spring 146 holds the device normally in inoperative position. A diamond or other dressing tool 147 is carried in an adjustable screw 148. A handle portion 149 for operating the device carries a knob 150 which knob is mounted upon a plunger 151 supported by a spring 152. The plunger engages a second plunger 153 supported by a spring 154. The lower end of the plunger 153 carries a contact button 155 which when moved down closes contact across contact springs 156 and 157. Closing of these contacts energizes relay 403 and closes switches for purposes which will be later described.

Automatic wheel dressing

In Figures 19 and 20 automatic mechanism is shown for operating the dressing device. The dressing device shown here is the same as that shown in Figure 18 except that power means is provided for rotating the dressing tool on its pivotal mounting. This power means consists of a cylinder 158, a piston 159 having a piston rod 160 connecting the piston to a lug 161 on the dressing device. Pressure fluid is supplied through line 162. The device is moved to inoperative position by a spring 146 as in the manually operable device shown in Figure 18. The device carries a switch arm 163 which engages a roller 164 to close switch 165 when the device is moved to inoperative position, to close circuit through relay coil 424 as will be more fully explained with reference to the diagrammatic showing in Figure 43.

An arm 166 is pivotally supported at 167 upon slide 139 and one end of this arm is attached by means of a link 168 to lug 161 on the dressing device and the other end of the lever 166 carries a roller 169 adapted to engage a cam 170 on the bed of the machine. This arrangement provides a positive means to move the dresser to inoperative position in case the spring 146 fails to operate and thus insures that no damage will be done to the dressing device during traverse of the work carriage.

Head stock

The head stock 17 is pivotally mounted upon the work carriage 16 (Figures 21, 22). The pivot point 171 (Fig. 3) is located substantially under the grinding point on the work to enable large angle tapers to be ground with a minimum amount of movement of the wheel cross slide. The head stock is adjustable by means of a pinion 172 and rack 173. The head stock is secured to the work carriage by a clamp 174 (Fig. 1). The head stock carries a spindle 175 which is rotated by motor 20 operating through a belt or other driving connection not shown, engaging a pulley or sprocket 176 which pulley is attached to a flange 177 on the spindle. The work holding fixture 19 is attached to the front face of the flange 177.

In the form shown in Figure 21 the work holding fixture is operated by fluid applied through line 178. The work is secured in the work holding fixture by longitudinal movement of a draw rod 179. Any suitable work holding fixture may be used with the machine, the particular fixture shown forming no essential part of the present invention. The inner end of the rod 179 carries a piston 180 operating in a cylinder 181. The rod 179 is moved toward releasing position by fluid pressure and is moved to work engaging position by a spring 182. Fluid pressure line 178 enters slip ring 183 and passes through a bushing 184 and through ports 185 into the cylinder 181 where it operates the piston 180 attached to the rod 179. A collar 186 serves to hold the slip ring 183 on its bearing. Fluid pressure to the head stock is controlled by the operator through valve 187 (Figs. 1 and 3). The cylinder 181 is rotated with the spindle 175. Positioned about the cylinder 181 is a cam 188. This cam engages a rod 192 which lifts a contact disk 190 breaking contact between this disk and contact points 191. These points are in circuit with main motor 20 when switch 195 is open. A spring 193 exerts pressure to hold rod 192 at all times in engagement with cam 188. The whole unit is housed in switch box 189. The purpose of this is to provide for stopping the spindle in the same position at all times when current from the motor 20 is cut off by switch 195 for circuit will be closed through contact points 191 and disk 190 to continue rotation of the spindle until it has reached a particular position at which the work may be most conveniently placed in or removed from the chuck. The work carriage has at its front side a cam 194 which engages the roller of a limit switch 195 as the work carriage approaches grinding position. Switch 195 controls operation of the head stock motor 20 so that the motor started as soon as the work reaches grinding position. When the work is ground to size and the work carriage 16 starts out to unloading position cam 194 releases the roller of switch 195 so that the motor 20 would stop unless circuit to the motor were maintained by some other switch. Contact disk 190 and contact points 191 maintain the circuit to the motor 20 closed until the spindle has been rotated to the desired angular position. This feature is of importance only with certain types of chucks in which the work may be placed only when in a given angular position.

In the form of head stock shown in Figure 22 the work holding fixture is operated through mechanical means. In this form of the device the draw rod 196 is operated manually by a lever or some other device engaging a spool 197. The draw rod is returned to work gripping position by means of a spring 198 engaging a collar 199. A coolant pipe 200 extends through the draw rod with its inner end positioned adjacent the work being ground. This pipe is clamped in position by a support 201. Other elements of the manually operated head stock are the same as those described above.

Coolant and air control

In Figures 23 to 26 inclusive mechanism is shown for controlling the flow of coolant to the grinding wheel and for controlling air to the sizing devices. Coolant for the grinding wheel is supplied by a pump or other pressure source 202 through a line 203. The line 203 preferably separates into two lines 204 and 205, one entering at the rear and the other at the front of the work, so as to project coolant in both directions against the grinding wheel. The flow of coolant through the pipe 203 is controlled by a valve 206. This valve is mounted on a bracket 207 which is adjustably mounted upon a slide 208 secured to the bed of the machine. A lever 209 is pivotally mounted at 210 on a portion 211 of the support 207. The rear end of the lever 209 has a stop screw 212 threaded through it adapted to engage a contact lug 213 on the support. The front of the lever 209 carries a roller 214 which is engaged by a cam 215 secured to a bracket 139 on the work carriage 16. The cam 215 may be adjusted along the bracket and secured in adjusted position by screws 223. The support 207 may be leveled vertically by means of screws 217. As the work approaches grinding position the cam 215 rides over the roller 214 on the lever 209 and depresses the plunger 216 to open valve 206 to admit coolant to the grinding wheel. Screw 212 may be adjusted so as to contact lugs 213 before the valve 206 is entirely closed, thus allowing a small amount of coolant to flow through if desired.

Air is supplied to the sizing devices through pipe 218 from a mercury switch and is controlled by valve 219. Valve 219 is operated by a lever 220 carrying a roller 221 engaged by a cam 222 mounted on bracket 139 and secured in adjusted position by screw 223. Other features of the structure of the valve and its operation are the same as those described with respect to valve 206. As the work approaches grinding position the cam 222 engages the roller and depresses the valve stem to open the valve and permit air to flow to the sizing device or devices as the case may be.

Work carriage traverse

The work carriage 16 is traversed by means of a fluid motor 224 having a piston 225 operable therein as shown in Figures 27 and 28. The piston rod 226 connects the piston with a bracket 227 secured to the lower side of the work carriage 16. Pressure fluid is supplied to the cylinder through ports 228 and 229. Control of fluid alternately to opposite sides of the piston 225 is effected by the reversing valve 271 in the main control valve shown in Figure 39. Bleeder tubes 230 and 231 are provided in the ends of cylinder 224 to permit any trapped air to escape from the cylinder. A tie rod 232 connects bracket 227 with the stop bracket 233. The purpose of this is to provide means for taking up the strain of movement of the work carriage without distorting the carriage. The tie rod 232 is put under tension so that it receives the first strain of starting and of stopping the work carriage. A fluid cushioning means is supplied for stopping the carriage. This consists of a cylinder 234 having a piston 235 operating therein. The piston carries a short piston rod or stub 236 which is engaged by an adjustable stop 237 carried by the work carriage. Chamber 238 at the rear of piston 235 is always filled with fluid from line 239.

A bleeder tube 240 permits the escape of air from chamber 238. On the inner side of the piston 235 is formed a stop 241 adapted to engage the stop 242 formed on the inner surface of the end of cylinder 234.

The means for operating valve 271 consists of a pair of levers 268 and 269 actuated by dogs 250, 254, and 260 on dog rack 246. Said rack is attached to the work carriage 16. Levers 268 and 269 are pivotally mounted in a single stud. Lever 268 is elongated and has a knob on one end to permit manual operation thereof. A lug 267 protrudes from said lever into the path of the reversing dogs. Lever 269 is just long enough to extend into the path of the reversing dogs when they are in their lowermost position. On the lower end of levers 268 and 269 are rollers 297 and 298 respectively. Said rollers engage the tops 279 and 278 respectively of two spring pressed plungers. A link connects lever 269 with valve 271. Lever 268 actuates lever 269 thru a lost motion arrangement consisting of a pin mounted in lever 268 and extending into an opening in lever 269. The width of said opening and hence the amount of lost motion between said levers is determined by the position of a pair of adjusting screws 270. Valve 271 is so adjusted that when a reversing dog engages only the lug 267, lever 268 moves far enough before it picks up lever 269 that roller 297 has moved across the center of plunger 279 by the time valve 271 is centered. Said plunger then completes the movement of lever 268 which carries lever 269 along to reverse valve 271. If the reversing dog is positioned to engage both levers, the lost motion will be eliminated and valve 271 will be centered before the rollers 297 and 298 have passed the centers of their respective plungers and thus reversal of the carriage will be prevented. Dogs 250 and 254 as disclosed in Figures 29, 30, 31 and 33 are vertically adjustable. Dog 250 may be positioned to engage one or both levers. Dog 254 may be positioned to engage both levers or to pass over said levers without engaging either of them. Dog 250 determines the limit of movement of the work carriage to the right and dog 260 determines the limit of movement of said carriage to the left. The function of dog 254 is to locate the carriage so that the dressing tool will be in operative position relative to the grinding wheel.

If it is desired to make the machine more nearly automatic a dog 264 as shown in Figure 32 may be substituted for dog 254. Dog 264 forms an extension of a piston 263 slidably mounted in a cylinder 262. Said cylinder is part of a bracket 261 adjustably mounted on dog rack 246. Fluid under pressure controlled by a sizing device or other suitable means may be utilized to move said dog in one direction and spring 265 in the other.

The sizing device for the work is of the pressure fluid type and is essentially that shown and described in the application of Balsiger, Serial No. 603,236, filed April 5, 1932 now Patent No. 2,019,066 dated October 29, 1935 and is shown in Figures 1 and 50. It consists of nozzles 450 and 451 to which are connected fluid supply lines 452 and 453 which are rigidly supported on a post 454 which in turn is mounted upon a bracket 455 secured upon the bed of the machine. Fluid is supplied to the air jets through a conduit 456. Air to the conduit 456 is controlled by the valve 219 which in turn is controlled by a cam 222 upon the work carriage. Air under pressure in fluid line 457 is passed through reducing valves 458 and 459 so as to provide a constant pressure in line 460. The line 460 is connected to a port in a block 461. This block has a restricted passage 462 and a conduit 463 leads from this restriction to the valve 219. One leg 464 of a mercury tube communicates with a chamber 465 in the block 461. The other leg 466 of the mercury tube is connected by means of pipe 467 with a port 468 which communicates with a restricted portion 462. The low portion of the mercury tube is partially filled with mercury 469. Air filters 470 and 471 are positioned in the leg 464 and in passage 467 respectively. Contact points 392 and 411 are positioned within the leg 466 of the mercury tube and as here shown are preferably sealed into the tube and connected with circuits shown and described in Figures 42 and 43. A contact 393 is carried on a wire 472 which is vertically adjustable by means of a screw and bracket 473 and 474. In operation as the work is reduced in size the space between the nozzle 450 and the surface of the work is increased so that fluid may flow more freely through pipes 463 and 456. This increases the velocity of the fluid from pipe 460 through the restricted passage 462 and this increased velocity reduces the pressure in pipe 467 and causes the mercury to rise in the left leg of the U-tube first to make contact at 393. This controls apparatus on the machine after the rough grinding of the work. When the work has further been reduced in size a further increase in the space between the work and the fluid nozzle permits fluid to flow still more freely through lines 463 and 456 to further reduce the pressure above the left of the mercury and cause contact to be made with point 411. This controls circuits which reverse the work carriage and such other mechanism as is operated when the work has been reduced to its finished size. To prevent rapid fluctuation of the mercury in the tube there is an insert 475 in the right hand tube 464 and this insert preferably has a cupped upper end upon which seats a float valve 476. The float valve is prevented from rising out of the tube by a rod 477. When the work carriage has been withdrawn from grinding position and the work consequently moved from between the nozzles the air would flow so rapidly out of the tube 456 as to cause the mercury to rise out of the tube 466. To prevent this, valve 219 is partly closed as soon as the cam 222 is withdrawn so that air is cut partially off from the sizing nozzles. The valve 219, however, is never completely closed. The adjustable screw in the rear of lever 220 is set to hold the valve partly open when the cam 222 leaves roller 221. This is to permit sufficient air to flow to hold the mercury below the roughing contact 393.

In Figures 44 to 49 inclusive are shown modified forms of sizing device. The form as shown in Figures 44 to 46 has a lower slide bracket 478 which is secured to the lower wheel base slide 14. The upper ends of this bracket has a tongued slide running transversely of the machine. An intermediate slide 479 is positioned on the slide bracket 478 and is adjustable transversely by means of adjusting screws 480 and locked in adjusted position by screws 481. The upper face of the intermediate slide 479 has a tongued slide running longitudinally of the machine. A bracket 482 is mounted upon the last named tongue slide and is adjustable longitudinally by means of screw 483 and locked in an adjustable position by screws 484. A post 485 is mounted upon the bracket slide 482 by means of a clamp 483 and a nut 487. A feeler bracket 488 is mounted upon the upper end of the post 485. The feeler bracket has a saw slot 489 running longitudinally which permits a portion of the feeler bracket 490 to be sprung backward and forward by a size adjusting screw 491. A nozzle support 492 is mounted upon the portion 490 of the bracket and a feeler finger 493 is pivotally mounted upon the nozzle support. The feeler finger has a hardened surface, preferably a diamond 494, which engages the interior of the work. The nozzle support carries a nozzle 495 to which fluid is supplied through a pipe 496. On the front side of the bracket 488 is an arm 497 in which is adjustably mounted an external feeler 498. This feeler consists of a screw with a hard point such as a diamond. This hard point rides on the outside diameter of the work holding chuck 19. Fluid is supplied to the tube 496 through a pipe 499. Air under substantially constant pressure from pipe 600 is reduced in pressure by a valve 601 to maintain a more nearly constant pressure in the tube 602. The latter tube is connected to a block 603, a passage 504 leads from a chamber 505 in the block 603 past a port 506 in the block into the tube 499. The port 506 connects through a pipe 507 with a leg 508 of a mercury tube. The opposite leg of the tube is provided with contacts such as those described in Figure 50. Air filters 509 and 510 are provided to prevent the entry of dust into the mercury tube. A pipe 511 contains the air control valve 512 which valve is controlled by movement of the work carriage. As work is reduced in size the feeler finger 493 will rock counter-clockwise as shown in Figure 44 to reduce the distance between the free end of the feeler finger and the nozzle 495. This reduces the flow of air from the pipe 499 and hence reduces the velocity of the air at the opening 504. The passage 504 together with port 506 form a venturi. A slight variation in pressure at the nozzle is magnified so as to give a much greater change in pressure in tube 507 and causes pressure in the tube 507 to build up pressure on the mercury in the tube 508 and first cause contacts 392 and 393 to be closed. This is done when the work has been reduced roughly to the correct size. When the work has been reduced to finished size contact is closed with contact point 411 to control the machine for finished size as has been and will be further described.

To further maintain a uniform pressure in the air line the chamber 505 communicates through a port 513 with the atmosphere. In this form of the device the valve 512 is arranged so that it is normally closed when the work is in grinding position and is open when the work carriage withdraws from grinding position so as to permit fluid to escape therethrough to prevent building up pressure in the head of the mercury tube 508. The hardened point 498 rides on the periphery of the fixture 19 which periphery is finished to correct size. The interior of the work is gauged with respect to this outside surface. The post 485 as shown in Figure 46 has a reduced portion 514 which permits this post to spring. The support for the post 485 is adjustable toward the portion 19 sufficiently to keep the hardened point 498 in contact with the periphery of the holding fixture. In Figure 47 is shown another form of the sizing device in which an air nozzle 515 is substituted for the feeler finger 493 of Figure 44. In this case air impinges against the interior of the work piece 21 itself. As the hole is increased in diameter the ground surface recedes from the nozzle thus lessening the air pressure and operating the mercury switch to control the machine as described with respect to Figures 44 and 49. In this case the nozzle is definitely located with respect to the work piece by contact of the hardened point 516 with a fixed portion of the machine.

Figure 48 shows still another method of sizing similar to Figure 47 except that an air nozzle 517 is substituted for the external feeler. In this case the action of the two nozzles is to make a caliper measurement from surface A to surface B of the work piece 21. If the grinding pressure of wheel 15 deflects the work piece 21 slightly backward, the gap between nozzle 517 and the external surface B of work piece is increased by the same amount as the gap between the external surface A and nozzle 518 is decreased, thus the net result on the air pressure supply to nozzles is zero. Thus this arrangement very accurately measures the work piece in spite of slight changes in position of the same. In Figures 44–47 inclusive the same result is obtained by the action of feeler 516. If the work is deflected slightly by the grinding pressure or for some other reason feeler 516 re-positions the sizing device by springing the post 485 at the reduced portion 514 more or less to compensate for this movement. Thus in all cases the internal measurement is made by using the external surface as a reference point. This introduces the fewest possible errors.

*Main control valve*

The main control valve is shown in section in Figure 39 and consists of a valve casing 272 on which are mounted a plurality of valves for controlling various functions of the machine. Valve 332 controls the positioning movement of the wheel support. Valve 271 controls the direction of movement of the work carriage. Valve 318 directs fluid to actuate a portion of the valve which controls the rate of reciprocation of the grinding wheel. Valves 318 and 271 are joined by a bracket 317 so that they may be operated simultaneously. Valve 313 controls the supplying of fluid to valve 271. This valve is operated in conjunction with a manually traversed mechanism disclosed in Figure 37 and which may be described as follows:

A hand traverse mechanism is mounted on a bracket 293 which in turn is attached to the bed of the machine. A lever 326 mounted on a vertical shaft 327 is utilized to render said traverse mechanism operative or inoperative. Attached to the other end of the shaft is an arm to which is attached a link 328 which in turn is attached to valve 313 so that when lever 326 is shifted to disengage the hand traverse mechanism, valve 313 is effective to direct fluid to the reversing valve and when the lever 326 engages the hand traverse mechanism said valve is shifted to return fluid to the reservoir without passing through the reversing valve. Fluid enters the valve body 272 through port 301 from which it is distributed through passage 309 in throttle valve 313 and then to reversing valve 271. Fluid also passes through passage 329 from which it is further distributed to valves 318 and 332. In one position of the reversing valve 271 fluid is directed through a check valve 243 and port 244 to the cushioning device for the work carriage. When the fluid is returned from the cushioning mechanism it follows the same path except that it is prevented from passing through check valve 243 and must pass at a controlled rate through throttle valve 245. The exhaust fluid from the valves 332, 318, and 271 passes on one side through lines 324 and on the other side through passage 226. Both these lines are brought together at the lower portion of the casing and fluid passes to the reservoir through opening 305.

*Dressing timing control*

In Figure 34 is shown a mechanism for controlling the time of the dressing operation. The purpose of this mechanism is to determine the length of time the work carriage is permitted to remain in dressing position. Valve 271 which controls the direction of movement of the work carriage is actuated by a lever 268 thru a link 600. Said lever is shifted by dogs on the carriage. Said dogs shift the lever and valve to central position and thus stop the movement of the carriage. Said lever and valve remain in this position until acted upon by the mechanism about to be described to complete the reversal of valve 271 which acts to reverse the movement of the work carriage. This mechanism consists of a piston 280 mounted on the cylinder 281 formed in a housing 274. A piston rod 287 extends upwardly thru the housing and has formed thereon a cam shaped portion 279. Said housing 274 contains a reservoir 277 having a passage 276 connecting the lower end thereof with cylinder 281. Another passage 275 connects the upper end of cylinder 281 with said reservoir. Needle valve 284 is mounted in said passage to vary the rate of movement of fluid therethru. In the top of the piston 280 is an opening in which is inserted a ball check valve 282, which permits fluid to pass upwardly thru the piston and prevents passage of fluid in the opposite direction. Piston 280 is held in the upward position by means of a spring 283. A lever 285 is pivotally mounted upon the housing 274 and has one end engaging a notch 286 in the piston rod 287. To the other end of the lever 285 is attached a cam 288 which is held in normal position by spring 289 which may flex to permit the lever to pass freely over a roller 290 on a switch operating arm 291. Arm 291 operates a switch within a housing 292, which housing may be adjusted by means of a screw 293. As the carriage traverses out for wheel dressing, dog 264 engages the lug 267 on lever 268 and causes the roller 297 on the lever 268 to pass from the top of plunger 279. The roller 298 on the lever 269 does not pass at this time over the top of plunger 278 due to the lost motion between screws 270 and a lug on the lever 269. Movement of the lever 268 however closes ports in valve body 272 and stops the carriage in wheel dressing position. When the roller 297 of lever 268 forced the plunger 287 down, the piston 280 is also forced down and fluid enters above this piston thru check valve 282. Spring 283 is also put under tension. The fluid which has been trapped above the check valve 282 is forced out thru ports into outlet 275 and passes out thru the needle valve 284 into the reservoir 277. The speed of the upward movement of piston 280 is controlled by the valve 284. As the plunger 287 rises the lever 268 is forced further over carrying its roller 297 over plunger 279, thus reversing valve 271 in valve body 272 and thus causing the carriage to start back to grinding position. As plunger 287 is forced down cam 288 on the end of lever 285 is forced up and the cam flexes past the roller 290 on the switch arm 291. As the piston 280 is forced up slowly by the spring 283 the cam 288 moves down forcing the roller 290 backward in passing it and breaks contact in the limit switch controlled by arm 291, as will be better understood from the description of Figure 43.

*Diagrammatic view of fluid circuits and electric control circuits for hand operated machines*

The manual, electrical and hydraulic control of the machine is shown in Figure 42. The electrical energy, in this case a three phase current, comes into the head stock motor starting contact box 387 over wires 381, 382 and 383. The work carriage traversing in closes limit switch 195 by means of cam 194. This closes a magnetic switch in box 387 and starts the head stock motor 20. It also energizes wires 385 and 386 from one phase of the motor circuit. These wires furnish energy to the whole electrical circuit. Current from 386 flows through 390 and 391 to the lower contact 392 of the mercury switch. When work carriage 16 moves to working position, cam 356 (Fig. 40) on the rear of said carriage engages roller 355 to shift valve 352 to direct fluid through needle valve 376 which determines the speed of reciprocation of the grinding wheel. As the work is rough ground the mercury rises until it touches contact 393 from which the current flows over wire 395 to limit switch 380. This switch being closed at this time the current flows into wire 396 and thence to relay 397 which closes. This relay closing connects wire 394 to wire 398 shunting out contacts 392 and 393 of the mercury switch, thus holding relay 397 closed notwithstanding breakage of the mercury switch circuit. The relay also connects 399 and 400 from which the current flows to 401, thus energizing solenoid 296. This solenoid shifts valve 332 to direct fluid pressure through pipe 338 to back side of piston 28 which backs the grinding wheel away from the work, thus stopping the grinding action. Fluid pressure from line 338 also flows to line 81 to operate piston 78 which turns shield 73 under feed pawl 65 thus stopping the mechanical feed.

The operator now shifts reversing lever 268 to the right to traverse the work carriage to dressing position. The throwing of the reversing lever also directs fluid through pipe 334 to port 361 against piston of valve 360 which directs fluid through needle valves 374 and 376 to give dressing speed to the reciprocation. The reciprocating stroke is also lengthened when the reversing lever is thrown by fluid pressure passing from pipe 334 through pipe 131 to piston 132 as shown in Fig. 12. He then grasps knob 150 on dresser and depresses it as he pulls dresser forward into dressing position. This closes the circuit between contacts 156 and 157 which carry current from wire 399 to 402 and thence close relay 403. The left pair of contacts on this relay close shunting the dresser switch 404 and 405 to hold the relay notwithstanding breakage of the dresser switch circuit at contacts 156 and 157. The middle pair of contacts close energizing solenoid 378 through wires 406, 407 and 385. This solenoid shifts valve 364 which connects ports 363 and 372 to needle valve 375 and this needle valve governs the reciprocating speed as soon as valve 360 returns to the left, to be described later. Valve 364 also directs fluid pressure to line 45 which shifts piston 43 to position stop 38 for finish feed. Solenoid 378 also opens the contacts of limit switch 380 disconnecting the roughing contact 393 of the mercury and de-energizing relay 397 by breaking its holding circuit.

The center pair of contacts also energize solenoid 90 through wires 409 and 410. This solenoid positions latch 85 to be engaged by dog 84.

The right hand contacts of relay 403 connect the finishing contact 411 of the mercury switch through wires 412 and 413 in readiness for operation when the mercury rises to this contact. The operator now dresses the wheel and when completed releases dresser which returns to idle position. He then throws the reversing lever 268 to the left which traverses the work carriage back to grinding position by moving valve 271. Valve 318 is also shifted, exhausting the fluid pressure from pistons 132 and 360 thus shorteneing the reciprocating stroke of the wheel carriage and directing the fluid pressure through needle valves 375 and 376 for finishing reciprocation speed. The reversing lever also strikes adjustable dog 299 which resets valve 332 to the right. This exhausts the back side of piston 28 through line 338 and directs fluid pressure to the front side through line 337, thus returning the wheel to grinding contact with the work with piston 28 against adjustable stop 37. Also the fluid is exhausted from the left of piston 78 through pipe 81. This allows piston 78 to return under spring pressure until dog 84 comes against latch 85 which allows the shield 73 to partially return giving a reduced finishing feed.

When the carriage reaches grinding position, the left dog 250 centers the reversing lever which, in turn, centers valve 271 thus stopping the flow of oil to piston 225. At the same time the carriage comes against the rod 236 of piston 235 driving the oil out through line 239 and needle valve 245 which restricts its passage and thus cushions the stopping of the carriage against stops 241 and 242.

The finish grinding operation now proceeds until the work piece coming to size allows the mercury to rise and touch contact 411, thus connecting circuits 386, 390, 391, 392 to 411 through line 412, right hand pair of contacts on relay 403 through 413 to the coil of relay 414 thus closing the relay. This relay energizes solenoid 296 in the same manner as relay 397 did above. Solenoid 296 causes the wheel to back away from the work in the same manner it did at the end of the roughing operation thus terminating the grinding operation.

*Wiring and hydraulic diagram-automatic machine*

The wiring and hydraulic circuits for fully automatic machines are shown in Figure 43.

The operator having loaded a work piece into the chuck throws lever 268 to the left. This shifts valves 271 and 318 to the right and also strikes adjustable dog 299 re-setting solenoid 296 and shifting valve 332 to the right. Valve 271 directs fluid pressure to the left side of piston 225 thus moving the work carriage 16 to the right.

As the carriage traverses to operative position cam 194 closes limit switch 195 to operate motor starter 387. This starts head stock motor 20 and supplies current to all relays except 424. It also energizes directly solenoid 427 to shift valve 428 and exhaust fluid from cylinder 101 and permit pawl 91 to move to inoperative position. Carriage traversing in, also actuates valve 352 through cam 356 to direct fluid to the wheel reciprocating mechanism.

Just before the carriage reaches grinding position adjustable stop 237 strikes piston rod 236 which retards the carriage movement and brings piston 235 lightly against stop 242, thus accurately positioning the work in grinding relation to the grinding wheel. At the same moment the dog 250 centers the reversing lever and valves 271 and 318, thus stopping flow of fluid to piston 225.

Valve 318 when shifted to the right exhausts the fluid from pistons 132 and 360 allowing them to be forced to roughing position by their respective springs. Piston 132 is shifted by the spring into such a position that it places the reversing dog for the wheel reciprocating mechanism in a position for accomplishing grinding reciprocation. Piston 360 is shifted by its spring in such a position that fluid pressure passes directly through needle valve 376 which is set to give a suitable traverse speed to the grinding wheel for the roughing cut.

Valve 332 when shifted to the right directs fluid pressure through valve 421 and line 337 to the front side of piston 28, which moves the wheel into grinding contact with the work. Valve 421 at this time is shifted to the right by solenoid 422, thus allowing the fluid to pass through. Solenoid 422 is normally energized in the following manner. Dresser 22 in the inoperative position keeps limit switch 165 closed completing the circuit from 382 through wire 423 to the coil of the relay 424 energizing this relay to complete circuit from 386 through the right hand pair of contacts of relay 424 through wire 425 to solenoid 422 and back to power line 385.

The machine is now rough grinding with roughing feed imparted intermittently by pawl 65 to ratchet feed wheel 66. This rough grinding continues until the increase in size of the work piece causes the mercury to rise in the mercury switch and complete the circuit from line 386, through contacts 392 and 393 to wire 395 through limit switch 380 and wire 396 to the coil of relay 426 energizing this relay. The right hand pair of contacts acts as holding circuit for relay 426, current flowing from line 386 through this right hand pair of contacts and through line 429 and limit switch 292 and lines 396 and 496 to the coil. It may flow through a parallel circuit from line 386 through the right contacts to line 429 and 431 through limit switch 432 to lines 433, 396 and 496 to the coil of the relay. These circuits hold the relay energized notwithstanding the breaking of the circuit between either 392 and 393 of the mercury switch or the breakage of the circuit at the limit switch 380. The left hand pair of contacts of relay 426 energize solenoid 296, the current passing from line 386 through the left hand contacts of relay 426 to line 434 and 435. Solenoid 296 shifts valve 332 to the left and also through dog 299 shifts the reversing lever 268 to withdraw the work carriage from grinding position by means of valve 271. Valve 332 when shifted to the left directs fluid through line 338 to the rear of piston 28 withdrawing the grinding wheel from grinding contact with the work, in a position to be dressed. Fluid also flows from line 338 to chamber 80 to the left side of piston 78 which places shield 73 under pawl 65 and thus stops the mechanical feed. At the same time valve 318 is shifted to the left directing fluid pressure through line 334 and 131 to 132 which shifts the reversing dogs to lengthen the reciprocation stroke for dressing the wheel. Fluid pressure also flows from line 334 to the piston of valve 360 shifting the valve so that it directs the fluid for reciprocation through needle valves 374 and 376. Valve 374 is set to give the slower reciprocation speed for dressing.

Simultaneously with the energizing of solenoid 296, solenoid 436 is energized by means of the middle pair of contacts of relay 426, the circuit being completed from line 386 through this pair of contacts and 437. Solenoid 436 shifts valve 438 to the left. This valve directs fluid pressure through line 439 to position automatic dog 264 to center reversing lever 268, stopping the carriage in a position to permit dressing the grinding wheel. Fluid pressure also flows from 439 through line 162 to piston 159 which pulls the dresser down into working position.

When dresser 22 moves down to dressing position switch arm 163 leaves the roller 164 of limit switch 165 breaking the circuit from 382 through the switch 165 to line 423, thus de-energizing relay 424. When this relay is de-energized the right hand pair of contacts are opened breaking circuit from 386 through 425 de-energizing solenoid 422. This allows valve 421 to move to the left shutting off the by-pass around check valve 442 to prevent the passage of fluid through line 337 to piston 28, thus preventing the wheel from rapid feeding into the dresser during the dressing operation. The left pair of contacts is closed when relay 424 is de-energized completing circuit from line 386 to the coil of relay 443, thus energizing this relay. The right hand pair of contacts of this relay 443 forms a holding circuit to hold the relay energized notwithstanding breakage of the circuit through the left hand contacts of relay 424. The center pair of contacts close a circuit from 386 to line 444 to energize solenoid 378. Solenoid 378 positions valve 364 to direct fluid through needle valve 375 when the dressing operation is completed. Valve 375 is set to give the proper reciprocation speed for the finish grinding. Valve 364 when shifted by solenoid 378 also directs fluid through line 45 to shift piston 43, thus positioning wheel base stop 37 for the finishing operation. Solenoid 378 also actuates limit switch 380 breaking the circuit between lines 395 and 396, thus rendering roughing contact 393 ineffective. The left hand pair of contacts connects finishing contact 411 to the coil of relay 445 in readiness to be actuated when mercury touches contact 411 later on.

Simultaneously with the energizing of solenoid 378, solenoid 90 is energized to position finish feed latch 85. When the reversing lever is shifted to bring the carriage in for finish grinding fluid pressure is exhausted by valve 332 from piston 78 to 338. This allows the piston to shift to the left until latch dog 84 engages latch 85 to position the shield 73, for a reduced finishing feed.

When reversing lever was thrown by solenoid 296 to traverse the carriage to dressing position, the roller 297 passes over the head 279 of plunger 287 depressing the plunger. The return of this plunger is retarded as shown in Figure 34 to provide sufficient intervals of time for the dressing operation. As it rises, an arm 285 opens limit switch 292 which is one leg of the holding circuit for relay 426. The other leg is limit switch 432 which is opened at either end of the reciprocating stroke of the grinding wheel. This finally breaks the holding circuit opening relay 426 to de-energize solenoid 436, thus returning dresser to inoperative position and withdrawing dressing dog 264 from the path of the reversing lever. The opening of relay 426 also de-energizes solenoid 296. Plunger 287 comes on up and the inclined surface of the head 279 shifts the reversing lever to bring the carriage back to grinding position, reset solenoid 296, and shift valve 332 to bring wheel back to grinding contact with the work as soon as dresser has completely returned to idle position closing limit switch 165 to energize solenoid 422 as explained above, to shift valve 421 to permit fluid to pass from valve 332 to front side of piston 28, thus feeding the grinding wheel into finish grinding position with piston 28 against stop 37.

The machine continues finish grinding until the increase in size of the work causes the mercury to rise in the mercury switch until it touches finish contact 411 completing the circuit from line 386, through contact 392, mercury contact 411, thence through the left hand pair of contacts of relay 443 through line 446 to the coil of relay 445 energizing this relay. The left hand pair of contacts of relay 445 act as a holding circuit to hold the relay energized notwithstanding the breaking of the mercury switch circuit. The right hand pair of contacts complete a circuit from line 386 to 435 to solenoid 296. The energizing of this solenoid backs the wheel away from grinding contact with the work as explained above, thus terminating the finish grinding. Solenoid 296 also shifts reversing lever 268 to traverse the work carriage 16 to loading position, the automatic dressing dog 264 having been removed from the path of the reversing lever as explained above. As the carriage traverses to loading position, cam 194 releases limit switch 195 stopping the head stock motor 20, and de-energizing all control relays except 424, thus resetting all controls to starting position. Cam 356 also releases valve 352 stopping the wheel reciprocation. The de-energizing of all the control circuits also de-energizes solenoid 427, thus shifting valve 428 to direct fluid through line 411 to piston 96. This operates pawl 99 on its ratchet to reverse the mechanical feed in readiness for the next work piece.

Deep hole grinding

For grinding holes having a greater depth than the maximum stroke of the grinding wheel, the work is reciprocated and the grinding wheel remains stationary. The only change in structure involved in using our machine in this manner is the sleeve 342 mounted on an extension of the valve 332. The end of said extension is upset to form a head 343 and a spring 344 is mounted on said extension between said head and a shoulder on the inside of sleeve 342. The free end of said sleeve is flanged and in the extreme right hand position of valve 332 it extends beyond the cover plate for the control mechanism. A latch 316 pivotally mounted on said cover plate may be dropped in the path of said flange and thus prevent said sleeve from moving to the left with said valve. Any suitable arrangement may be utilized to actuate the feed mechanism from the reciprocating movement of the work carriage. The operation of the machine for deep hole grinding is as follows:

The operator shifts lever 268 to the left and fluid is directed from valve 271 through line 328 to shift the work carriage toward the grinding wheel. Dog 250 is adjusted so that it will engage only the lug 267 on lever 268. Dog 254 is raised to pass over lug 267 after which it is dropped to a position similar to that of dog 250. Said dogs are effective in this position to cause reversal of valve 271 as the carriage traverses. When a predetermined size is reached, the sizing device energizes solenoid 296 which acts through link 600 to shift valve 332 to left hand position. Latch 316 having been positioned to prevent movement of sleeve 342, said solenoid must act against spring 344. Stop 299 on link 600 has been moved to an inoperative position so that it is ineffective to shift the reversing valve. The operator lifts dog 250 and shifts the reversing valve to move the carriage to inoperative position where dog 260 engages both levers to center the valve and stop the carriage.

Having thus fully described our said invention, what we claim as new and desire to secure by Letters Patent, is:

1. In a grinding machine of the kind described having a work carriage and a grinding wheel carriage movable toward and from each other, a work holding device having a surface movable through a fixed point relative to the position of the work in the holding device, a sizing device adapted to engage said surface at said fixed point and responsive to variations in the distance between said point and a given point on the work, said variation causing the control of the movements of the work carriage and the grinding wheel carriage, substantially as set forth.

2. In a machine of the kind described, a work support movable toward and from working position, a sizing device, a fluid line to connect said sizing device with a fluid supply, a valve in said line, and means responsive to movement of said support to actuate said valve to control the flow of fluid to said sizing device.

3. In a machine of the kind described, a work support, fluid means to move said support toward and from grinding position, a control valve for said fluid means, a wheel support, fluid means to reciprocate said wheel support axially at a given speed, a sizing device responsive to change in size of a work piece, means actuated by said sizing device to change the speed of said reciprocating movement and means responsive to actuation of said control valve to further change the speed of said reciprocating movement when said work support moves toward working position.

4. In a machine of the kind described a work support movable axially toward and from operative position, a dressing tool mounted thereon, a wheel support reciprocable in operative position, means to reciprocate said wheel in contact with a work piece, means responsive to a change in size of the work piece to move said work support out of operative position and said dressing tool into operative position, while said wheel continues to reciprocate in operative position, said reciprocating movement being effective to pass said wheel across said dressing tool, whereby, said tool grinds and is dressed in substantially the same position.

5. A grinding machine having a work support, a wheel support and a wheel dressing device, means to cause relative axial movement of said work support toward and from said wheel support, means responsive to said axial movement to initiate a continuous reciprocatory movement of said wheel support, means responsive to a change in the size of a work piece to separate said supports and to cause said dressing device to be placed in operative relation with said wheel, adjustable means to determine the duration of the period of separation of said supports and thereafter to effect withdrawal of said dressing tool and return of the work and wheel to operative relation.

6. A machine of the kind described having a work support and a wheel support, means to effect relative transverse movement of one of said supports toward the other to cause a grinding action between the wheel and the work, a sizing device comprising a pair of feelers, one adapted to engage the surface being ground, the other being spaced radially therefrom and adapted to engage a fixed finished surface, variation in the surface being ground causing a relative movement between said feelers, and means responsive to said movement to terminate the grinding operation.

7. In a machine of the kind described, a work support movable toward and from operative position, a tool support adapted to be continuously reciprocated in working position, mechanism to effect movement of said work support, another mechanism to effect reciprocation of said tool support, means responsive to movement of the work support toward and from working position to start and stop said reciprocating mechanism, means to vary the speed and extent of reciprocation of said reciprocating mechanism and a single lever in control of movement of said work support and said means for varying speed and extent of reciprocation.

8. In a machine of the kind described, a work support, a tool support, fluid means to move said work support into and out of operative relation with said tool support, fluid means to effect a reciprocatory movement of said tool support, means responsive to movement of said work support toward and from operative position to start and stop said reciprocatory movement, a lever to control the fluid means for moving said work support, and means responsive to movement of said lever in one direction to separate said supports, and to increase the length and decrease the speed of said reciprocatory movement.

9. In a machine of the kind described, a work support, a tool support, fluid means to move said work support into and out of operative relation with said tool support, fluid means to effect a reciprocatory movement of said tool support, means responsive to movement of said work support toward and from operative position to start and stop said reciprocatory movement, a lever to control the fluid means for moving said work support, and means responsive to movement of said lever in one direction to separate said supports and to increase the length and decrease the speed of said reciprocatory movement, said means being responsive to movement of said lever in the opposite direction to bring said supports together again and to decrease the length and increase the speed of said reciprocatory movement.

10. In a machine of the kind described a reciprocable carriage, fluid means to reciprocate said carriage comprising a fluid motor, a reversing valve, means to actuate said valve comprising dogs on said carriage, a pair of levers, one having lost motion and adapted when actuated by said dogs to reverse said valve, the other having no lost motion and adapted to move said valve to central position and stop said carriage, dogs on said carriage adapted to engage and shift said levers, one of said dogs being adjustable to selectively engage one or the other of said levers.

11. In a machine of the kind described a work support, a tool support, fluid pressure means to move said work support toward and from operative relation with said wheel support, fluid pressure means to effect a continuous axial reciprocation of said tool support, means responsive to movement of said work support into operative position to start said reciprocating movement, said first fluid means being operable to withdraw said work support a distance sufficient to permit dressing said tool while the reciprocating movement of said tool support continues.

12. In a machine of the kind described a work support, a wheel support, fluid means to effect a relative transverse positioning movement between said supports to advance said supports toward operative relation, means operable to effect a feeding movement between said supports, an adjustable stop to limit said positioning movement, means to position said stop for a rough grinding operation and automatic means to thereafter adjust said stop to a less advanced position for finished grinding.

13. In a machine of the kind described a reciprocable carriage, fluid means to reciprocate said carriage comprising a fluid motor, a reversing valve, means to actuate said valve comprising dogs on said carriage, a pair of levers, one having lost motion and adapted when actuated by said dogs to reverse said valve, the other having no lost motion and adapted to move said valve to central position and stop said carriage, dogs on said carriage adapted to engage and shift said levers, one of said dogs being adjustable to selectively engage one or both of said levers and means for automatically positioning said dog.

HAROLD E. BALSIGER.
EDGAR P. WINE.
DANIEL GURNEY.